US008259176B2

(12) United States Patent
Misawa et al.

(10) Patent No.: US 8,259,176 B2
(45) Date of Patent: Sep. 4, 2012

(54) INFORMATION PROVISION APPARATUS, INFORMATION PROVISION SYSTEM AND INFORMATION PROVISION METHOD

(75) Inventors: Takeshi Misawa, Asaka (JP); Sumie Mikami, Asaka (JP); Masaaki Koshiba, Asaka (JP); Akihisa Yamazaki, Asaka (JP); Motoari Ota, Asaka (JP)

(73) Assignee: Fujifilm Corporation, Tokyo (JP)

( * ) Notice: Subject to any disclaimer, the term of this patent is extended or adjusted under 35 U.S.C. 154(b) by 1479 days.

(21) Appl. No.: 11/723,922

(22) Filed: Mar. 22, 2007

(65) Prior Publication Data

US 2007/0222797 A1    Sep. 27, 2007

(30) Foreign Application Priority Data

Mar. 24, 2006  (JP) ................................. 2006-084030
Jun. 19, 2006  (JP) ................................. 2006-168793

(51) Int. Cl.
*H04N 9/47* (2006.01)
*H04N 7/18* (2006.01)

(52) U.S. Cl. ........ 348/158; 348/143; 348/144; 348/145; 348/146; 348/147; 348/148; 348/149; 348/150; 348/151; 348/152; 348/153; 348/154; 348/155; 348/156; 348/157; 348/159; 348/160; 348/161; 348/100

(58) Field of Classification Search ........... 348/143–161
See application file for complete search history.

(56) References Cited

U.S. PATENT DOCUMENTS 6,005,562 A * 12/1999 Shiga et al. ................... 715/721

| 2003/0025793 | A1* | 2/2003 | McMahon ................... 348/148 |
| 2004/0175169 | A1* | 9/2004 | Azuma et al. ............... 396/310 |
| 2005/0021625 | A1* | 1/2005 | Fujimura et al. ............ 709/204 |
| 2007/0222797 | A1* | 9/2007 | Misawa et al. .............. 345/629 |

FOREIGN PATENT DOCUMENTS

| JP | 2002-247045 A | 8/2002 |
| JP | 2003-323239 A | 11/2003 |
| JP | 2003-323440 A | 11/2003 |
| JP | 2003-330953 A | 11/2003 |

OTHER PUBLICATIONS

Yamamoto et al. The Journal of the Institute of Image Information and Television Engineers, vol. 59, No. 12, pp. 1830-1840 (2005).
Japanese Office Action dated Jan. 31, 2012 for Application No. 2006-168793.

* cited by examiner

*Primary Examiner* — Emmanuel L Moise
*Assistant Examiner* — Edward Kim
(74) *Attorney, Agent, or Firm* — Birch, Stewart, Kolasch & Birch, LLP

(57) ABSTRACT

According to an aspect of the present invention, it is possible to visually show both of information which is originally visually recognizable and information which is originally not seen that have been provided from equipment on the same image, so that it is possible to grasp the content of information and the source of providing the information corresponding to or in association with each other. Furthermore, it is possible to view information difficult to visually recognize together with visually recognizable information, and it is possible to clearly grasp, in addition to information which can be visually obtained at the place where a user currently stays, information related to the visually obtained information, from an image visually indicating the association.

6 Claims, 36 Drawing Sheets

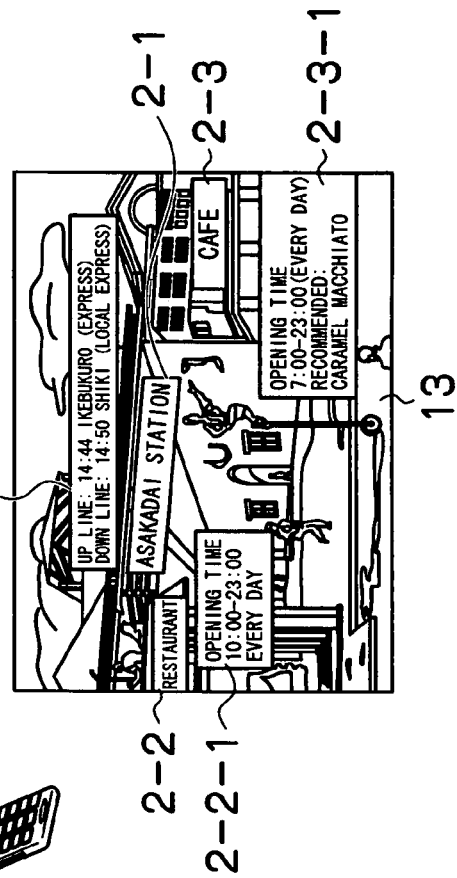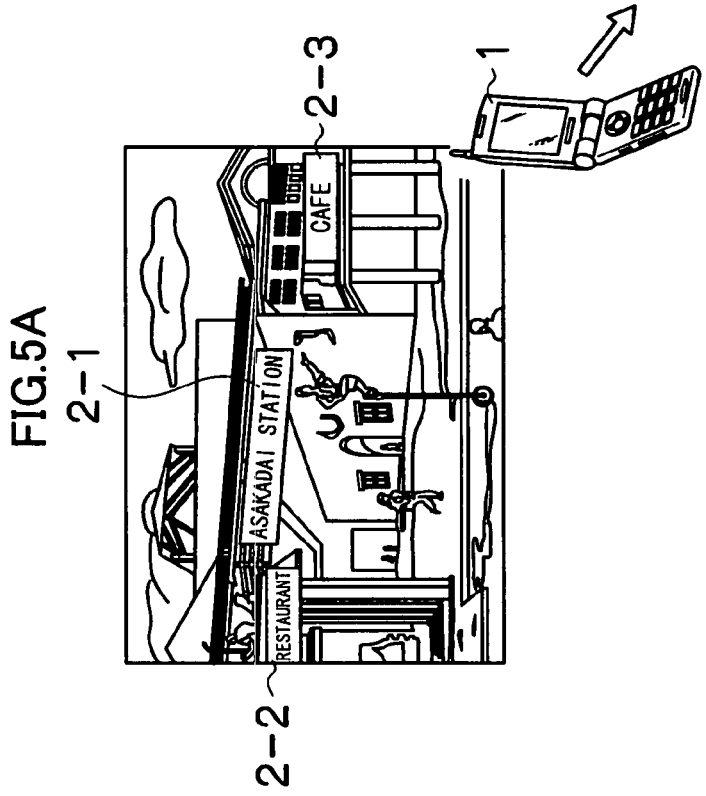

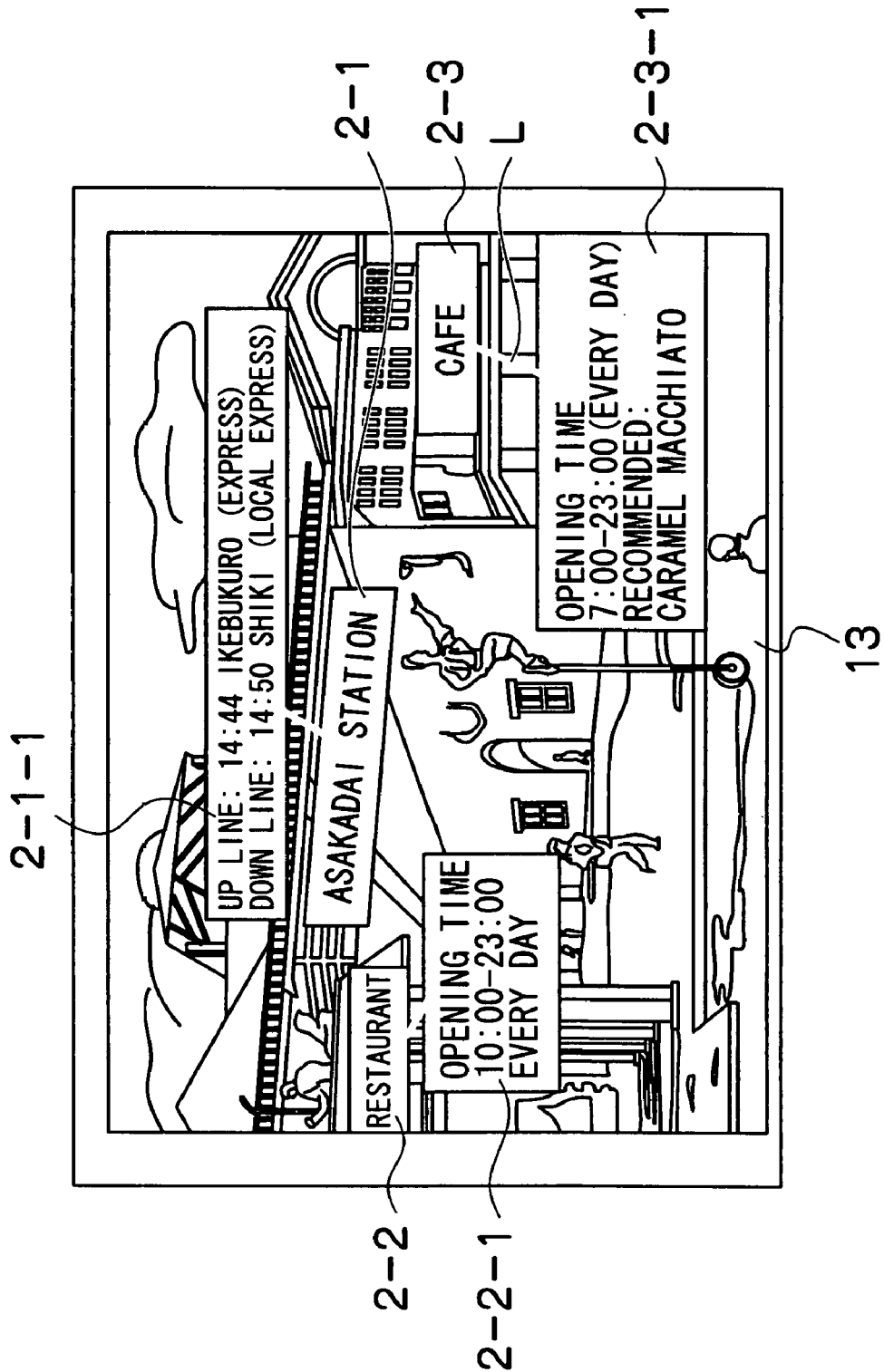

ALTERNATE DISPLAY

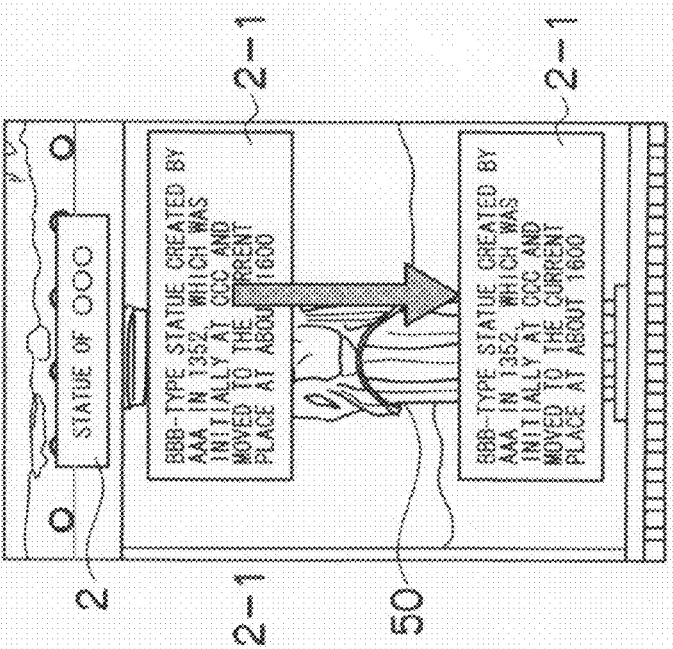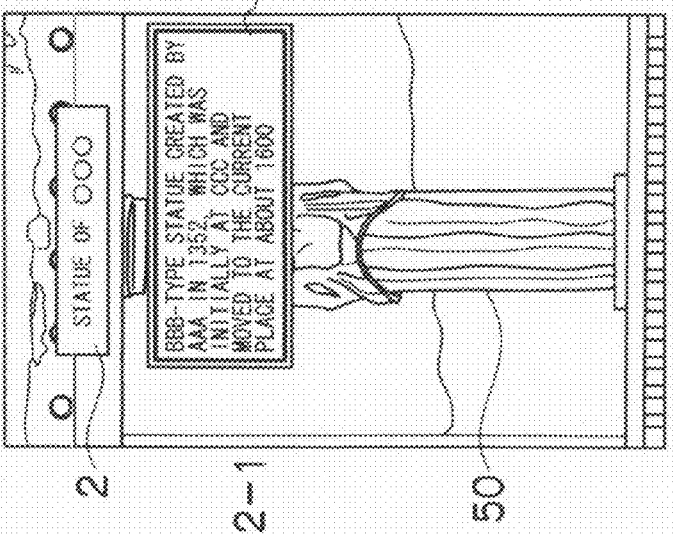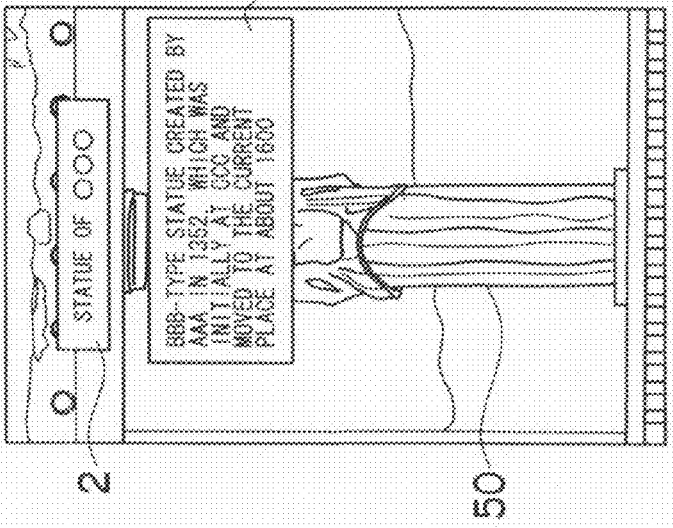

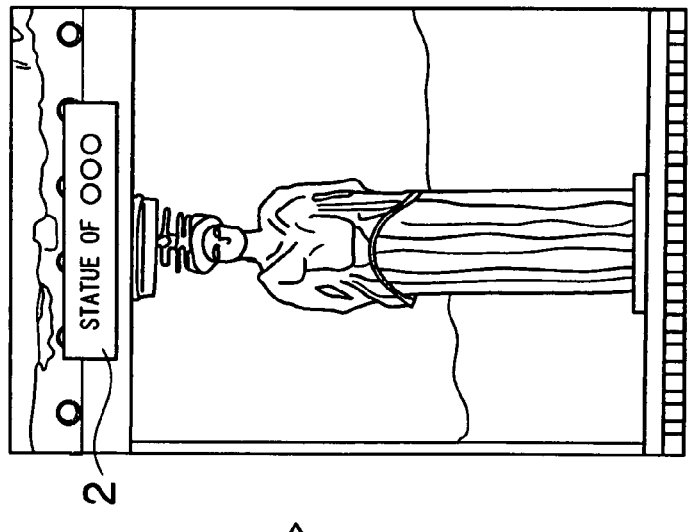
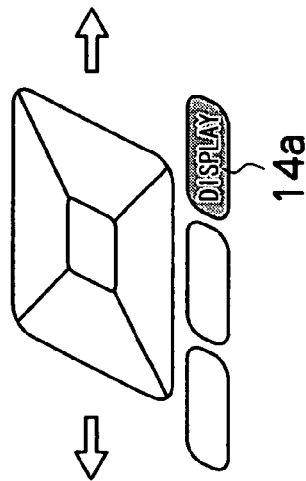
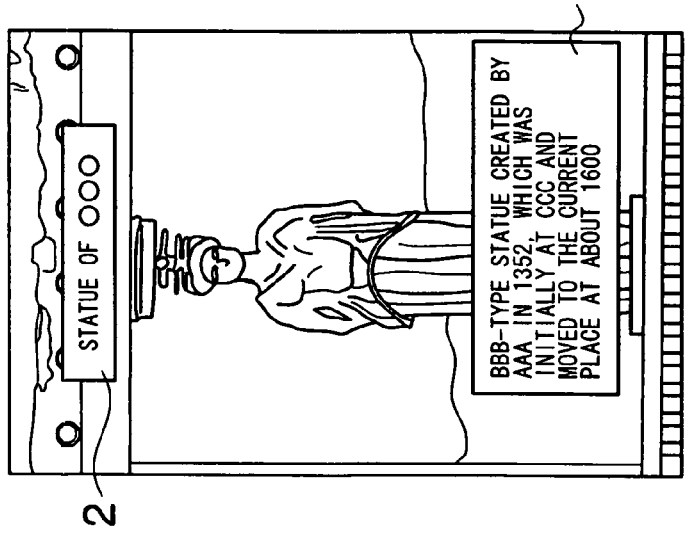
FIG. 20A  FIG. 20B

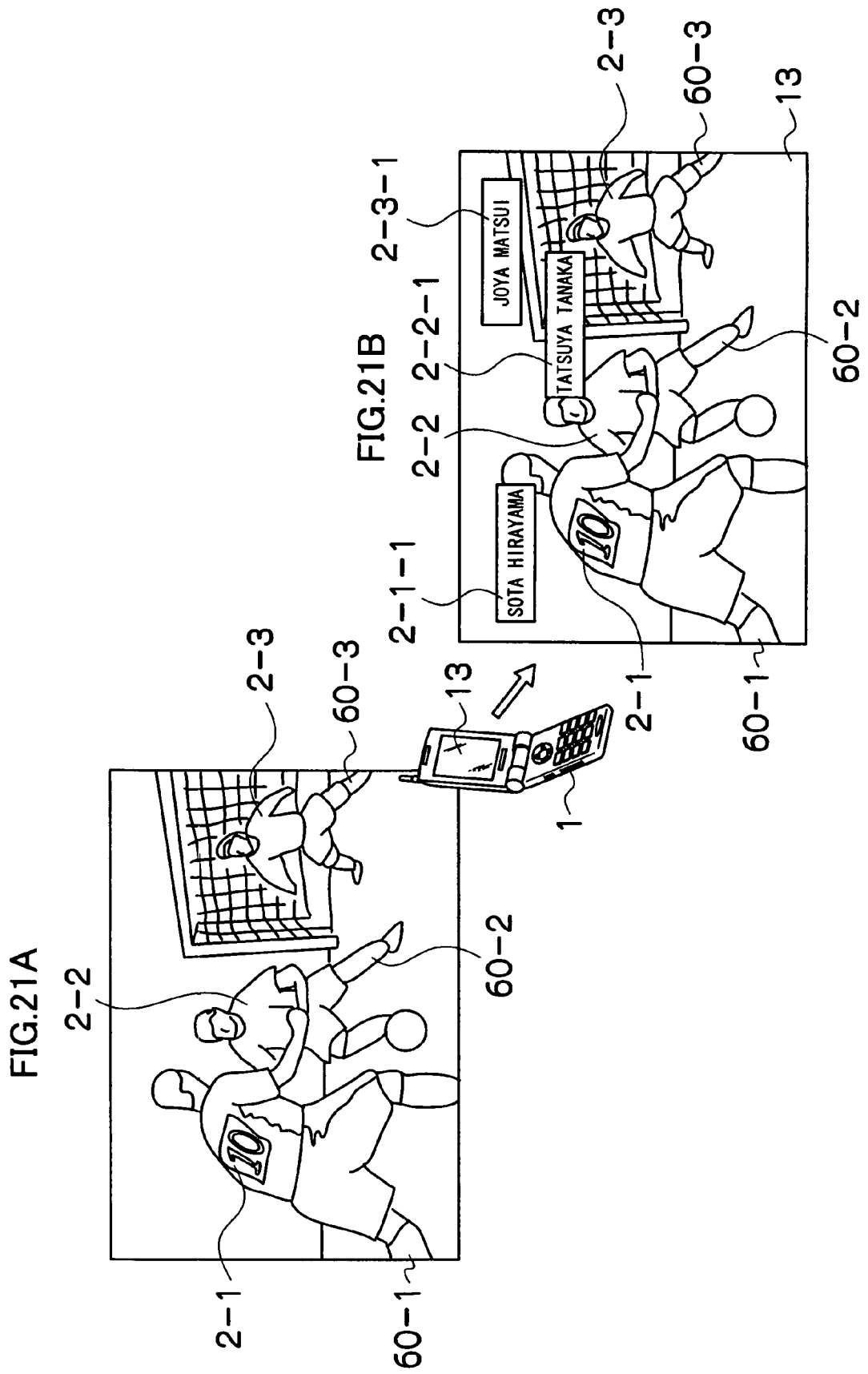

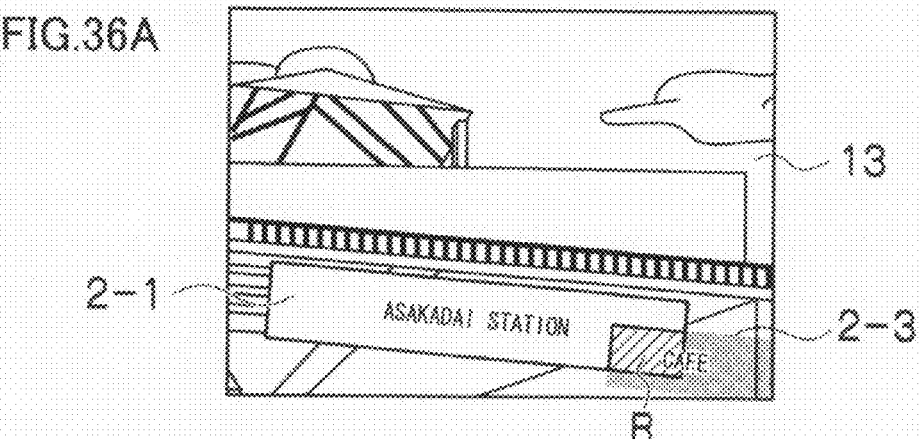
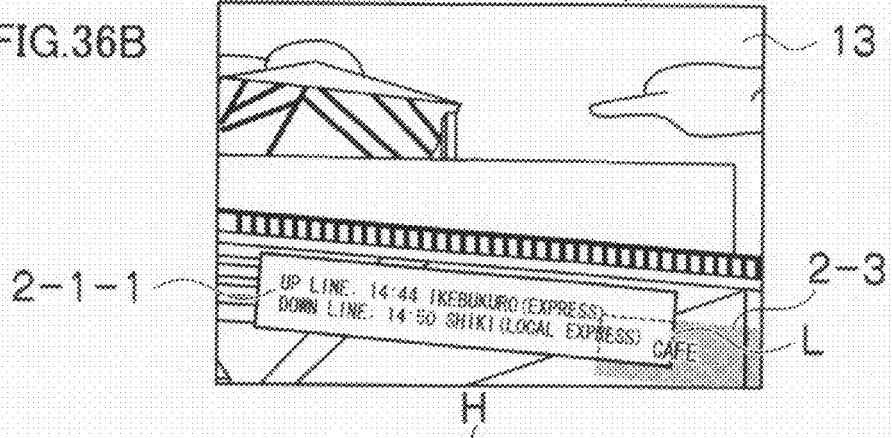
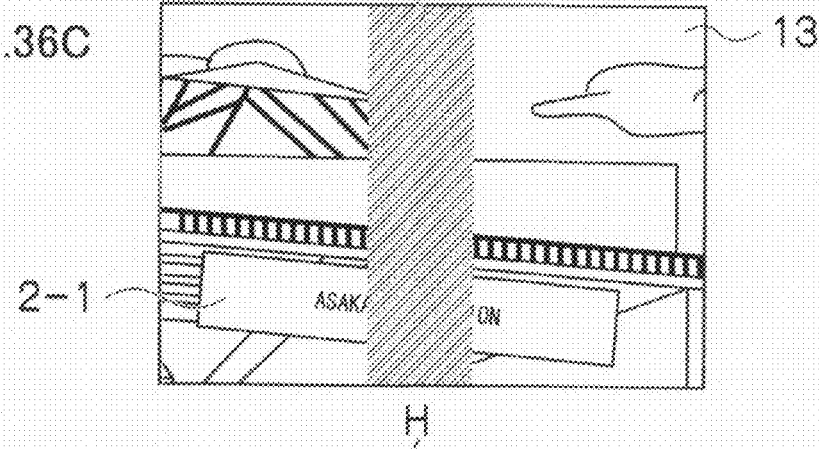
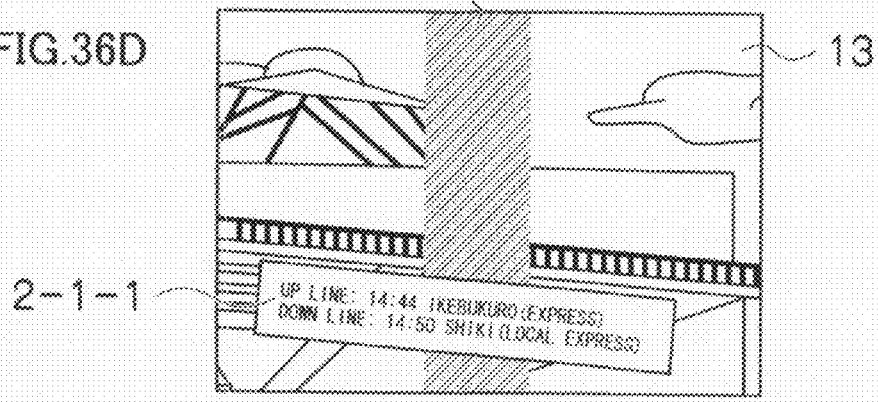

13

10% DISCOUNT ON ALL ITEMS NOW!

INFORMATION PROVISION APPARATUS, INFORMATION PROVISION SYSTEM AND INFORMATION PROVISION METHOD

BACKGROUND OF THE INVENTION

1. Field of the Invention

The present invention relates to a technique for acquiring and providing various information with the use of an imaging element.

2. Description of the Related Art

Conventionally, there exists a technique for acquiring position information from an image of a photographed scenery and acquiring information related to the position. Japanese Patents Application Laid-Open No. 2003-330953, No. 2003-323440 and No. 2002-247045 relate to such a technique.

Recently, there have also been developed various techniques for instinctively and understandably controlling desired equipment with a single controller. For example, according to "Proposal of 'OPTO-NAVI' System, which is an information-appliance multi-purpose remote controller using a low power consumption ID-receiving CMOS image sensor having a function of reading a partial area at a high speed" (The Journal of the Institute of Image Information and Television Engineers Vol. 59, No. 12, pp. 1830-1840 (2005)), an ID is received from equipment by taking normal images in real time with the use of a custom image sensor mounted on a mobile phone. The received ID is shown on a display, being superimposed on the taken background image. A user can perform an operation while visually recognizing the target equipment and the ID on the display.

SUMMARY OF THE INVENTION

None of Japanese Patents Application Laid-Open No. 2003-330953, No. 2003-323440 and No. 2002-247045 and "Proposal of 'OPTO-NAVI' System, which is an information-appliance multi-purpose remote controller using a low power consumption ID-receiving CMOS image sensor having a function of reading a partial area at a high speed" discloses a concrete device for understandably presenting information related to information which can be visually obtained at the position where a user currently stays.

The present invention has been made in consideration of such a problem, and an object of the present invention is to provide visual information obtained from a position where a user currently stays and provide information different from the visual information in association with the visual information.

Another object of the present invention is to make it possible to select and provide information required by the user so that the visual information provided from the user's current position is not cumbersome.

Another object of the present invention is to provide detailed information at the user's current position as required so that the information is not cumbersome.

Another object of the present invention is to provide visual information provided from the user's current position in a form which can be perceived more understandably when it is difficult for the user to visually recognize the information.

An information provision apparatus according to a first aspect of the present invention is provided with: an acquisition section which captures an equipment for optically providing visually recognizable information and information difficult to visually recognize as a subject to continuously acquire an image including the visually recognizable information and the information difficult to visually recognize by an imaging element; a display control section which converts the information difficult to visually recognize acquired by the acquisition section to visually recognizable picture information and displays the picture information and the image including the visually recognizable information on a display device, the picture information being superimposed on the image including the visually recognizable information; and a display setting section which sets the kind of a picture visually indicating association between the visually recognizable information and the picture information; and the display control section controls the display device to display the picture visually indicating the association on the image according to the kind set by the display setting section.

Thereby, it is possible to visually show both of information which is originally visually recognizable and information which is originally not seen that have been provided from equipment on the same image, so that it is possible to grasp the content of information and the source of providing the information corresponding to or in association with each other.

Furthermore, it is possible to view information difficult to visually recognize together with visually recognizable information, and it is possible to clearly grasp, in addition to information which can be visually obtained at the place where a user currently stays, information related to the visually obtained information, from an image visually indicating the association.

Furthermore, since it is possible for the user to select the kind of picture visually indicating the association, to the user's taste, it becomes further easier to grasp the content of information and the source of providing the information in association with each other.

The picture visually indicating the association may include at least any one of a picture in which the picture information is arranged near the visually recognizable information in the image, a picture in which a line positioned between the visually recognizable information in the image and the picture information is shown, and a picture in which a words frame from the visually recognizable information in the image and the picture information arranged in the words frame are shown, a picture in which gradual appearance of the picture information from the visually recognizable information in the image is shown, and a picture in which the visually recognizable information in the image and the picture information are alternately displayed.

There may be further provided a recording section which records at least one of the image and the picture information in a condition that the picture information is visually associated with the visually recognizable information or in a condition that the picture information is not visually associated with the visually recognizable information.

That is, it is possible to record information which is originally difficult to visually recognize in association with an image as picture information.

There may be further provided a recording setting section which sets whether or not to record the image in the condition that the picture information is visually associated with the visually recognizable information, whether or not to separately record the information difficult to visually recognize or whether or not to separately record the image; and the recording section may record the image in the condition that the picture information is visually associated with the visually recognizable information, separately record each of the image and the information difficult to visually recognize in the condition that the picture information is not visually associated with the visually recognizable information, separately record the information difficult to visually recognize or separately record the image.

Thereby, the number of options about what format the visually recognizable information is to be recorded in can be increased.

There may be further provided a movement setting section which sets a destination position to which the picture information is to be moved on the display section; and the display section may move the picture information to the movement destination position set by the movement setting section and displays the information at the position.

By making it possible to freely move the position of picture information, it does not occur that a target to be viewed is interfered with the picture information.

There may be further provided a display enable/disable setting section which sets whether or not to display the picture information; and the display section may display or may not display the picture information according to the setting made by the display enable/disable setting section.

By enabling non-display of picture information, it does not occur that a target to be viewed is interfered with the picture information.

An information provision system according to a second aspect of the present invention is provided with: an information provision section which optically provides visually recognizable information and information difficult to visually recognize; an acquisition section which captures the information provision section as a subject to continuously acquire an image including the visually recognizable information and the information difficult to visually recognize by an imaging element; a display control section which converts the information difficult to visually recognize acquired by the acquisition section to visually recognizable picture information and displays the picture information and the image including the visually recognizable information on a display device, the picture information being superimposed on the image including the visually recognizable information; and a display setting section which sets the kind of a picture visually indicating association between the visually recognizable information and the picture information; and the display control section controls the display device to display the picture visually indicating the association on the image according to the kind set by the display setting section.

An information provision method according to a third aspect of the present invention includes the steps of: captures an equipment for optically providing visually recognizable information and information difficult to visually recognize as a subject to continuously acquires an image including the visually recognizable information and the information difficult to visually recognize by an imaging element; converting the acquired information difficult to visually recognize to visually recognizable picture information and displaying the picture information and the image including the visually recognizable information on a display device, the picture information being superimposed on the image including the visually recognizable information; and setting the kind of a picture visually indicating association between the visually recognizable information and the picture information; and displaying the picture visually indicating the association on the image according to the set kind.

An information provision apparatus according to a fourth aspect of the present invention is provided with: an acquisition section which captures an equipment for optically providing visually recognizable information, information difficult to visually recognize, and classification information classifying the information difficult to visually recognize as a subject, to continuously acquire an image including the visually recognizable information, the information difficult to visually recognize and the classification information by an imaging element; a display classification setting section which sets the classification information about information to be displayed among the information difficult to visually recognize which has been acquired by the acquisition section; and a display control section which converts the information difficult to visually recognize classified by the classification information set by the display classification setting section to visually recognizable picture information and displays the picture information and the image on the display device, the picture information being superimposed on the image.

According to the fourth aspect of the present invention, information difficult to visually recognize, which is classified by selected classification information, is converted to picture information and displayed. Since only information belonging to the classification desired by a user can be presented, it does not occur that the user is confused by mixture of necessary information and unnecessary information.

An information provision apparatus according to a fifth aspect of the present invention is provided with: an acquisition section which captures an equipment for optically providing visually recognizable information, information difficult to visually recognize and trigger information, which is information specifying a source of providing information related to the visually recognizable information, as a subject, to continuously acquire an image including the visually recognizable information, the information difficult to visually recognize and the trigger information by an imaging element; a display control section which converts the information difficult to visually recognize acquired by the acquisition section to visually recognizable picture information and displays at least one of the picture information and the trigger information on the image including the visually recognizable information in association with the image on the display device; an information selection section which selects desired trigger information among the trigger information displayed on the display device; and a related information provision section which acquires and provides the related information from a provision source specified by the trigger information selected by the information selection section.

According to the fifth aspect of the present invention, in the case of receiving provision of a large amount of real-time related information, such as real-time delivery of a picture or voice in a store or a pub, it is possible to, by selecting trigger information specifying a desired information provision source as necessary, efficiently obtain the related information from the information provision source without acquiring all the information from information difficult to visually recognize.

Thereby, it is not necessary to manually input telephone number information visually obtained at the current position for access.

The trigger information may include the address of a content data delivery source; and the related information provision section may be provided with a communication section which connects to the address of the content data delivery source included in the trigger information selected by the information selection section to acquire the related information.

Thereby, it is not necessary to manually input telephone number information visually obtained at the current position for telephone calling.

As an example, the content data includes at least one of a picture or voice related to a source of providing the visually recognizable information.

The trigger information may include the telephone number of the source of providing the visually recognizable information; and the related information provision section may be provided with a telephone conversation section which connects to the telephone number included in the trigger information selected by the information selection section to transmit and receive at least conversation voice.

An information provision apparatus according to a sixth aspect of the present invention is provided with: an acquisition section which captures an equipment for optically providing visually recognizable information and information difficult to visually recognize as a subject to continuously acquire an image including the visually recognizable information and the information difficult to visually recognize by an imaging element; a display control section which converts the information difficult to visually recognize acquired by the acquisition section to visually recognizable picture information and displays the picture information and the image including the visually recognizable information on a display device, the picture information being superimposed on the image including the visually recognizable information; and a voice control section which converts information difficult to visually recognize acquired from a predetermined position in the effective pixel area of the imaging element to aurally recognizable voice information and reproduces the voice information from a voice reproduction device.

According to the sixth aspect of the present invention, information difficult to visually recognize acquired from a predetermined position in the effective pixel area of an imaging element is converted to aurally recognizable voice information and reproduced from a voice reproduction device. Therefore, in the case where, even though information difficult to visually recognize is converted to picture information and displayed, a user cannot see it well for some reason, it is convenient.

As an example, the predetermined position includes a position corresponding to the central part of the display device in the effective pixel area of the imaging element.

Thereby, the user can recognize the effective pixel area of the imaging element and information related to the information existing at the central part of the display device via voice. In order to change the information to be reproduced by voice, the information to be captured by the central part of the effective pixel area is simply changed.

An information provision apparatus according to an seventh aspect of the present invention is provided with: an acquisition section which captures an equipment for optically providing visually recognizable information and information difficult to visually recognize as a subject to continuously acquire an image including the visually recognizable information and the information difficult to visually recognize by an imaging element; an area recognition section which recognizes an area for which the equipment provides visually recognizable information; and a display control section which converts the information difficult to visually recognize acquired by the acquisition section to visually recognizable picture information and displays the picture information on a display device in a condition that the picture information is superimposed on the area in the image including the visually recognizable information, which has been recognized by the area recognition section, in a manner that the picture information fits to the area.

Thereby, information difficult to visually recognize is converted to picture information and then displayed in a manner that it fits to the display area of the equipment which has transmitted the information, and therefore, the picture information is arranged being adapted to the information transmission source and becomes easy to see. Furthermore, the content of the information and the information provision source can be grasped in association with each other.

An information provision system according to an eighth aspect of the present invention is provided with: an information provision section which optically provides visually recognizable information, information difficult to visually recognize and classification information classifying the information difficult to visually recognize; an acquisition section which captures the information provision section as a subject to continuously acquire an image including the visually recognizable information, the information difficult to visually recognize and the classification information by an imaging element; a display classification setting section which sets the classification information about information to be displayed among the information difficult to visually recognize which has been acquired by the acquisition section; and a display control section which converts the information difficult to visually recognize classified by the classification information set by the display classification setting section to visually recognizable picture information and displays the picture information and the image on the display device, the picture information being superimposed on the image.

An information provision system according to a ninth aspect of the present invention is provided with: an information provision section which optically provides visually recognizable information, information difficult to visually recognize and trigger information, which is information specifying a source of providing information related to the visually recognizable information; an acquisition section which captures the information provision section as a subject to continuously acquire an image including the visually recognizable information, the information difficult to visually recognize and the trigger information by an imaging element; a display control section which converts the information difficult to visually recognize acquired by the acquisition section to visually recognizable picture information and displays at least one of the picture information and the trigger information on the image including the visually recognizable information in association with the image, on the display device; an information selection section which selects desired trigger information among the trigger information displayed on the display device; and a related information provision section which acquires and provides the related information from a provision source specified by the trigger information selected by the information selection section.

An information provision system according to a tenth aspect of the present invention is provided with: an information provision section which optically provides visually recognizable information and information difficult to visually recognize; an acquisition section which captures the information provision section as a subject to continuously acquire an image including the visually recognizable information and the information difficult to visually recognize by an imaging element; a display control section which converts the information difficult to visually recognize acquired by the acquisition section to visually recognizable picture information and displays the picture information and the image including the visually recognizable information on a display device, the picture information being superimposed on the image including the visually recognizable information; and a voice control section which converts information difficult to visually recognize acquired from a predetermined position in the effective pixel area of the imaging element to aurally recognizable voice information and reproduces the voice information from a voice reproduction device.

An information provision system according to an eleventh aspect of the present invention is provided with: an information provision section which optically provides visually recognizable information and information difficult to visually recognize; an acquisition section which captures the information provision section as a subject to continuously acquire an image including the visually recognizable information and the information difficult to visually recognize by an imaging element; an area recognition section which recognizes an area for which the equipment provides visually recognizable information; and a display control section which converts the information difficult to visually recognize acquired by the acquisition section to visually recognizable picture information and displays the picture information on a display device in a condition that the picture information is superimposed on the area in the image including the visually recognizable information, which has been recognized by the area recognition section, in a manner that the picture information fits to the area.

An information provision method according to a twelfth aspect of the present invention includes the steps of: capturing an equipment for optically providing visually recognizable information, information difficult to visually recognize and classification information classifying the information difficult to visually recognize as a subject, to continuously acquire an image including the visually recognizable information, the information difficult to visually recognize and the classification information by an imaging element; setting the classification information about information to be displayed among the acquired information difficult to visually recognize; and converting the information difficult to visually recognize classified by the classification information set by the display classification setting section to visually recognizable picture information and displaying the picture information and the image on the display device, the picture information being superimposed on the image.

An information provision method according to a thirteenth aspect of the present invention includes the steps of: capturing an equipment for optically providing visually recognizable information, information difficult to visually recognize and trigger information, which is information specifying a source of providing information related to the visually recognizable information, as a subject, to continuously acquire an image including the visually recognizable information, the information difficult to visually recognize and the trigger information by an imaging element; converting the acquired information difficult to visually recognize to visually recognizable picture information and displaying at least one of the picture information and the trigger information on the image including the visually recognizable information in association with the image on the display device; selecting desired trigger information among trigger information displayed on the display device; and acquiring and providing the related information from a provision source specified by the selected trigger information.

An information provision method according to a fourteenth aspect of the present invention includes the steps of: capturing an equipment for optically providing visually recognizable information and information difficult to visually recognize as a subject to continuously acquire an image including the visually recognizable information and the information difficult to visually recognize by an imaging element; converting the acquired information difficult to visually recognize to visually recognizable picture information and displaying the picture information and the image including the visually recognizable information on a display device, the picture information being superimposed on the image including the visually recognizable information; and converting information difficult to visually recognize acquired from a predetermined position in the effective pixel area of the imaging element to aurally recognizable voice information and reproducing the voice information from a voice reproduction device.

An information provision method according to a fifteenth aspect of the present invention includes the steps of: capturing an equipment for optically providing visually recognizable information and information difficult to visually recognize as a subject, continuously acquiring an image including the visually recognizable information and the information difficult to visually recognize by an imaging element; recognizing an area for which the equipment provides visually recognizable information; and converting the acquired information difficult to visually recognize to visually recognizable picture information and displaying the picture information on a display device in a condition that the picture information is superimposed on the area in the image including the visually recognizable information, which has been recognized by the area recognition section, in a manner that the picture information fits to the area.

According to the present invention, it is possible to visually show both of information which is originally visually recognizable and information which is originally not seen that have been provided from equipment on the same image, so that it is possible to grasp the content of information and the source of providing the information corresponding to or in association with each other.

BRIEF DESCRIPTION OF THE DRAWINGS

FIGS. 5A and 5B are diagrams showing that a picture taken by the information display apparatus is displayed on a display section;

FIG. 6 is a diagram showing that relationship between the information transmission apparatus and information transmitted by the information transmission apparatus is visually recognizably displayed by a line;

FIGS. 17A to 17C are diagrams showing that an information display position is moved;

FIGS. 20A and 20B are diagrams showing that display of information and non-display of information are switched;

FIGS. 21A and 21B are diagrams showing that information transmitted from the information transmission apparatus configured by an athlete's electronic number plate is displayed on the information display apparatus;

FIGS. 36A to 35D are diagrams showing the state of display of information in the case where planar forms on the display section are overlapped with each other.

DETAILED DESCRIPTION OF THE PREFERRED EMBODIMENTS

Figure 1:
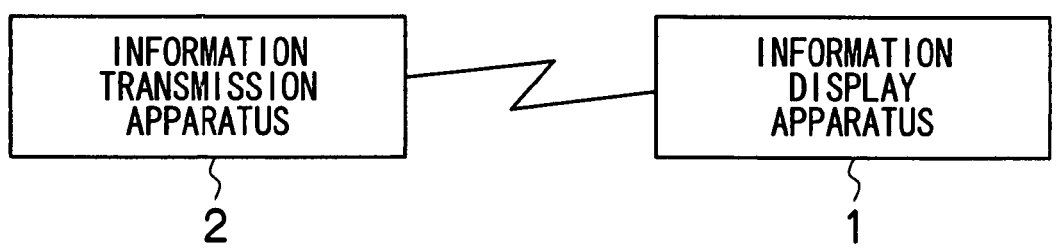
FIG. 1 is a schematic configuration diagram of an information provision system.

FIG. 1 is a schematic configuration diagram of an information provision system according to a first embodiment of the present invention. This system includes a portable information display apparatus 1 and one or more information transmission apparatuses 2 for optically providing information for the information display apparatus 1.

Figure 2:
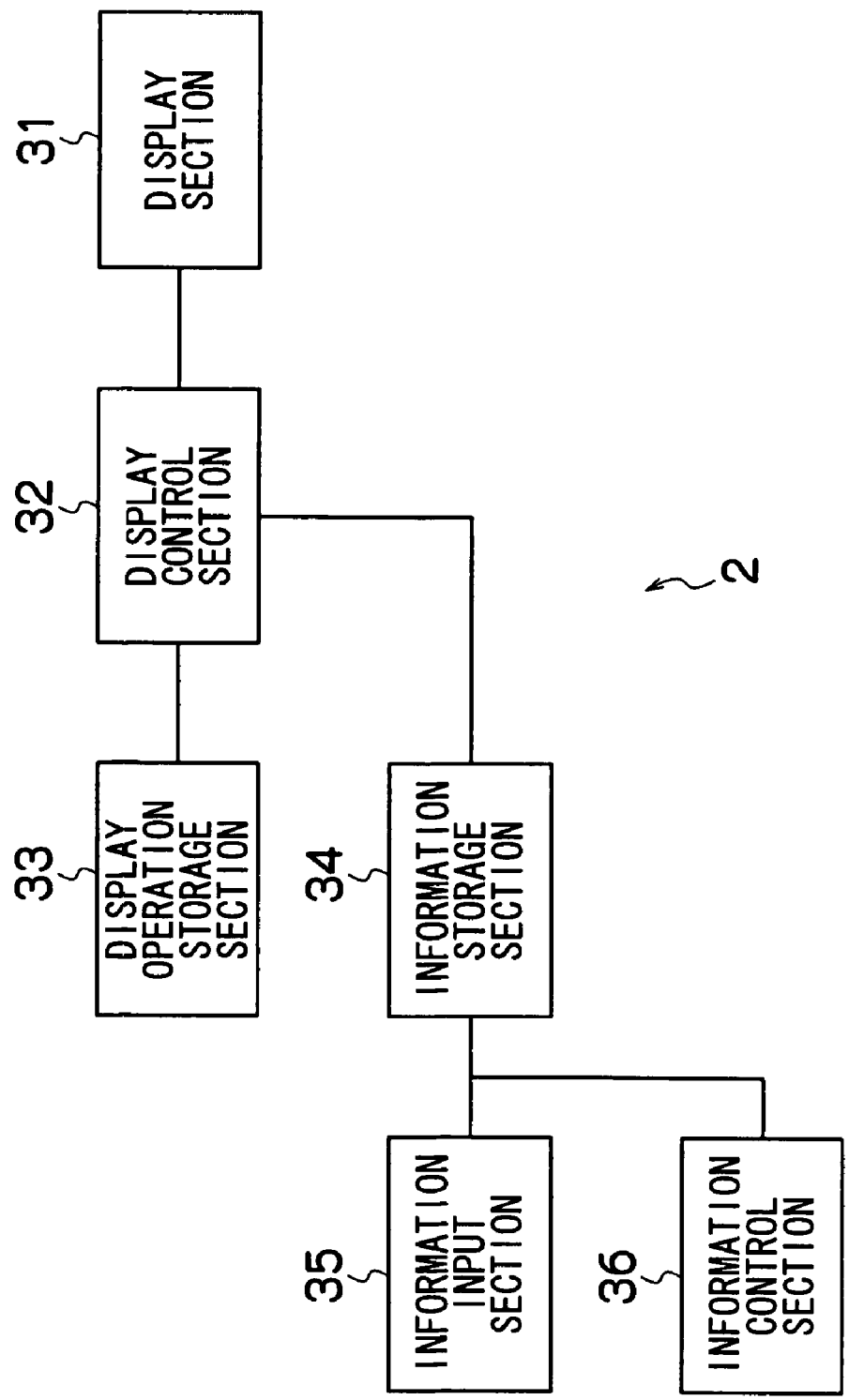
FIG. 2 is a block configuration diagram of an information transmission apparatus.

FIG. 2 is a detailed configuration diagram of the information transmission apparatus 2. The information transmission apparatus 2 is provided with a display section 31, a display control section 32, a display operation storage section 33, an information storage section 34, an information input section 35 and an information control section 36.

The display section 31 can be configured by an information display apparatus such as an electronic bulletin board and a display using LED emitters, liquid crystal and the like.

The display control section 32 controls display of desired information by controlling blink of the light emitters of a display section 31 in accordance with an emission pattern stored in the display operation storage section 33 in advance. The information to be displayed is provided from the information storage section 34.

The information input section 35 receives input of any information to be displayed on the display section 31, from an external personal computer or server. As the inputted information, character information, formatted character information, image information and the like are included. The information inputted from the information input section 35 is stored in the information storage section 34 configured by a storage medium such as an ADD in response to a direction by the information control section 36.

The information control section 36 reads the information stored in the information storage section 34 in response to an instruction to start display of the information which is inputted by a user or automatically issued at a predetermined time and provides it for the display control section 32. The display control section 32 and the information storage section 34 are not necessarily required to be directly connected with each other via a single route. They may be connected with each other via a network.

The display control section 32 controls the blink of the light emitters of the display section 31 to display the information read from the information storage section 34 on the display section 31. Thereby, visually recognizable information is displayed on the display section 31. As an example of the displayed information, the name of a station, a restaurant or a coffee shop is given. If the display section 31 is configured by a large-sized display device, it can play a role of a signboard and can be easily identified from a place which is a little distant therefrom.

In the case of desiring to display such information as regularly changes, for example, the nearest arrival time of a train or the opening time for each day of the week, a program for reading information corresponding to the current time and date is simply executed by the information control section 36. As for such information as irregularly changes or information to be suddenly displayed, for example, delay time of a train, necessary information is simply inputted to the information input section 35 each time and provided for the display control section 32 immediately.

The display control section 32 controls the frequency of the blink of a part or all of the light emitters of the display section 31 (preferably, emitters of a part which does not overlap with a part for displaying visually recognizable information) and continuously transmits predetermined information read from the information storage section 34 as optical signals difficult to visually recognize, from the display section 31. Which information is to be outputted as the optical signals difficult to visually recognize or visually recognizable picture information is specified by the information control section 36 in accordance with a user operation or the like.

For example, if the display section 31 is an LED-type electronic signboard, it is difficult for common people to recognize the blink of LED's with about 60 Hz or above, though it depends on the brightness. Therefore, by causing the LED's to blink with 60 Hz to several hundred Hz, optical signals difficult to visually recognize are transmitted. By increasing the frequency, the amount of information which can be transmitted by an optical signal also increases, and it is advantageous. However, because of the human visual characteristic of being sensitive to flicker, it is preferable to transmit the optical signals with a frequency of about 70 to several hundred Hz.

The display control section 32 controls the display section 31 to overlap a low-frequency pilot signal notifying the position of a part transmitting information difficult to visually recognize in the display section 31, with an optical signal. If the light emission devices of the display section 31 are LED's, and low-frequency modulation of brightness (change in the level of brightness) is originally provided, the pilot signal can be overlapped with the use of the brightness modulation. Since common people are familiar with blink of an electronic bulletin board, they do not feel unfamiliar with transmission of the pilot signal by modulating brightness.

In addition, a method is also conceivable in which the brightness of a part for emitting a particular color (as for single-color LED's, the wavelength can be specified) is modulated to a predetermined value or above at a low frequency. In this case, it is preferable to set an upper limit of modulation of detected brightness on side of the information display apparatus 1 because there is a possibility that the receiving side may detect light reflected from the sun or other light sources as a pilot signal.

Figure 3:
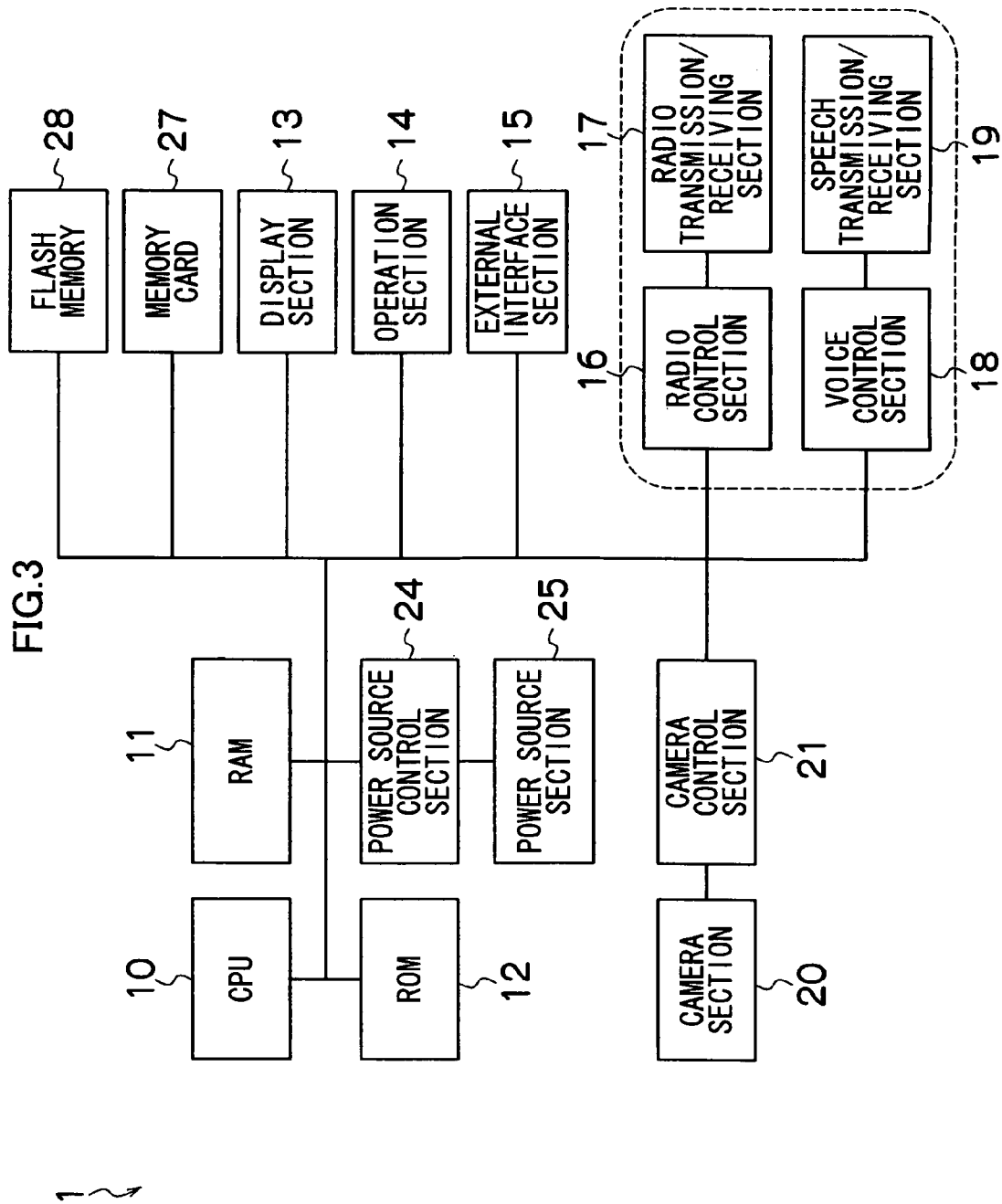
FIG. 3 is a configuration diagram of an information display apparatus.

FIG. 3 is a functional block diagram of the information display apparatus 1. Each block shown in FIG. 3 is mounted in a portable, light and small-sized case, and a user can move to various places carrying the portable information display apparatus 1. The information display apparatus 1 may be configured, being integrated with various portable information terminal equipment such as a mobile phone and a PDA.

The information display apparatus 1 includes a camera section 20 which includes an image-taking lens, a solid-state image sensor such as a CMOS and a CCD, an analog front-end circuit for processing an analog image read from the solid-state image sensor by a driver to a digital signal, a signal processing circuit such as a DSP (digital signal processor) for processing a digital image signal from the analog front-end circuit; and a camera control section 21 which is configured by a one-chip microcomputer or the like and which is for controlling the image-taking operation of the camera section 20.

The information display apparatus 1 is also provided with a CPU 10 for performing overall control of the operation of the respective sections, a ROM 12 for storing various data and programs, and a RAM 11 for storing various data required for processing by the CPU 10.

In the ROM 12, a control program for the CPU 10 to control each block in accordance with an operation of an operation section 14 and GUI for visually displaying the relationship between a taken picture and received information are stored for each of the multiple information transmission apparatuses 2.

For example, an optical double zoom lens is used as the image-taking lens, and the optical zoom magnification is changed by a motor driver forward and backward driving the image-taking lens to the telephotographic (tele) side or the wide-angle (wide) side in accordance with a magnification change operation inputted from the operation section 14. The magnification of the image-taking lens is not limited to the above. An aperture is provided for the image-taking lens. An appropriate amount of exposure is obtained by controlling the aperture via the motor driver.

When the photographing mode is set by the operation section 14, the CPU 10 displays a motion picture (live images) on the display section 13 to enable confirmation of the image-taking angle of field. That is, the solid-state image sensor converts a light of a subject which is incident through the image-taking lens and is formed on the light-receiving surface of the image sensor to an amount of signal charge corresponding to the amount of the light. The signal charges of respective pixels accumulated in this way are sequentially and individually read by the driver as voltage signals (image signals) corresponding to the signal charges, based on a driving pulse given by a timing generator in accordance with a direction from the CPU 10 and converted to digital signals in the analog front-end circuit, and each of them is added to the signal processing circuit.

The signal processing circuit includes a gain adjustment circuit and an A/D converter. It is an image processing device which includes a brightness/color difference signal generation circuit, a gamma correction circuit, a sharpness correction circuit, a contrast correction circuit, a white balance correction circuit, an outline processing section for performing imaging processing including outline correction for a taken image, a noise reduction processing section for performing noise reduction processing of an image and the like, and it processes an image signal in accordance with a command from the CPU 10.

The image data inputted into the signal processing circuit is converted to a brightness signal (Y signal) and a color difference signal (Cr/Cb signal), and the signals are stored in the VRAM after predetermined processings such as gamma correction is performed therefor.

When the monitor output of a taken image to the display section 13 is performed, a Y/C signal is read from the VRAM and sent to a display control section 26. The display control section 26 converts the inputted Y/C signal to a signal of a predetermined method for display (for example, a compound color picture signal of an NTSC method) and outputs it to the display section 13.

The Y/C signals of respective frames which have been processed at a predetermined frame rate are written in an A area and a B area of the VRAM alternatively, and a written Y/C signal is read not from the area in which a Y/C signal is being written but from the other area, between the A and B areas. By the Y/C signals in the VRAM being periodically overwritten, and picture signals generated from the Y/C signals being provided for the display section 13, the picture being taken is displayed on the display section 13 in real time. The user can confirm the image-taking angle of field by the picture (live images) displayed on the display section 13.

Here, when a photographing key provided on the operation section 14 is pressed, a photographing operation for storage is started. Image data acquired in response to the pressing of the photographing key is converted to a brightness/color difference signal (Y/C signal) in the signal processing circuit, and it is stored in the RAM 11 after predetermined processings such as gamma correction are performed therefor.

The Y/C signal stored in the RAM 11 is compressed in accordance with a predetermined format by a compression/expansion processing circuit and then stored in a memory card 27 as an image file in a predetermined format such as an Exif file. The image file can also be stored in a flash memory 28.

When the reproduction mode is set by the operation section 14, the compressed data of the final image file stored in the flash memory 28 (a file stored last) is read. When the file stored last is a still image file, the read compressed image data is expanded to an uncompressed Y/C signal via the compression/expansion processing circuit and stored in the VRAM. The Y/C signal stored in the VRAM is added to the display control section 26. The display control section 26 creates a compound RGB color picture signal of the NTSC method from the inputted Y/C signal and outputs it to the display section 13. Thereby, the frame image of the last frame stored in the memory card 27 is displayed on the display section 13.

After that, when the right key of a cross key provided on the operation section 14 is pressed, frame advancing is performed in the forward direction, and when the left key of the cross key is pressed, frame returning is performed in the opposite direction. Then, an image file at the frame position set by the frame advancing or returning is read from the memory card 27, and a frame image is reproduced on the display section 13 similarly as described above. If frame advancing is performed in the forward direction when the frame image of the last frame is displayed, the image file of the first frame stored in the memory card 27 is read, and the frame image of the first frame is reproduced on the display section 13.

The number of pixels of an image file to be stored is, for example, any of 2832×2128 (6 M), 2048×1536 (3 M), 1280×960 (1 M) and 640×480 (VGA), and the amount of data of a taken image (the file size) changes according to the combination of the stored image quality and the number of stored pixels.

The information display apparatus 1 can be configured, for example, by a camera-equipped mobile phone or a digital camera as shown in "Proposal of 'OPTO-NAVI' System, which is an information-appliance multi-purpose remote controller using a low power consumption ID-receiving CMOS image sensor having a function of reading a partial area at a high speed".

When the camera section 20 takes an image of the information transmission apparatuses 2 as a subject, information optically transmitted by each information transmission apparatus 2 can be acquired together with the image.

The camera control section 21 converts information overlapped with an optical signal entered from an external information transmission apparatus 2 to digital data and outputs it to the CPU 10.

The information display apparatus 1 is provided with a radio transmission/receiving section 17 which transmits and receives radio signals such as mobile communication electric wave IrDA, Bluetooth, Wireless LAN and Wireless USB signals with the information transmission apparatuses 2, a radio control section 16 which converts a received radio signal to data to transmit it to the CPU 10 or overlaps a remote control signal specified by the CPU 10 with a radio signal, and an external interface section 15 which communicates with the information transmission apparatuses 2 and other equipment via a network in accordance with TCP/IP or other standards.

Basically, provision of information from the information transmission apparatus 2 to the information display apparatus 1 is performed via optical communication. However, in the case of desiring to acquire a large amount of information from the information transmission apparatus 2, it is possible to access the information transmission apparatus 2 via a network to acquire the desired information.

The information display apparatus 1 is provided with a speech transmission/receiving section 19 including a voice amplification device which emits voice, such as a speaker, a speech receiving device which receives voice and converts it to an electrical signal, such as a microphone, and a communication device which transmits and receives voice outputted to the voice amplification device or voice inputted from the speech receiving device to and from a counterpart terminal via mobile phone base station in accordance with a communication mode such as the CDMA mode; and a voice control section 18 for controlling the content of speech from the voice amplification device. The voice control section 18 has a function of recognizing a particular voice pattern specified by the CPU 10 from a voice signal inputted from the speech transmission/receiving section 19.

The CPU 10 can also control each block in response to voice received by the speech transmission/receiving section 19. That is, control of each block can be performed not only by an input operation to the operation section 14 but also by input of voice.

Figure 4:
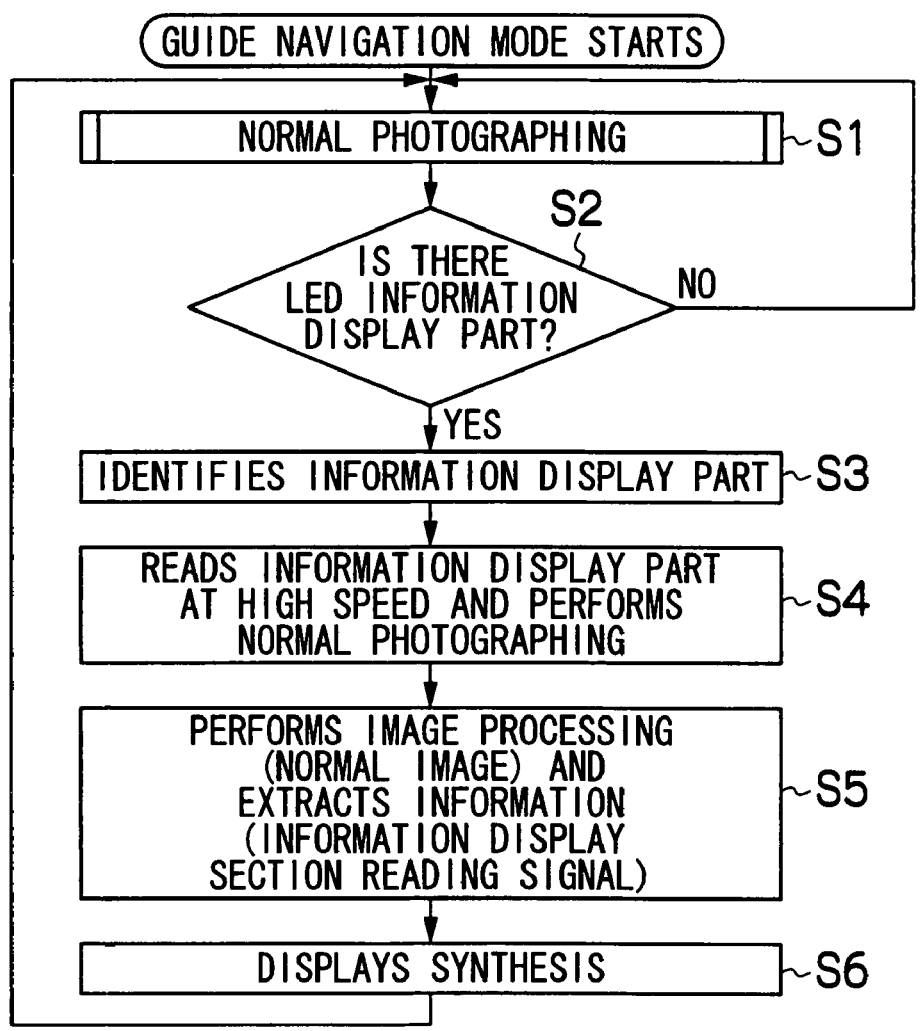
FIG. 4 is a flowchart showing the flow of guide navigation mode processing according to a first embodiment.

FIG. 4 is a flowchart showing the flow of the guide navigation mode processing executed by the information display apparatus 1.

At step S1, the CPU 10 directs the camera control section 21 to start an image acquisition operation in response to an instruction to take an image which has been inputted to the operation section 14 or the speech transmission/receiving section 19. The camera control section 21 controls the camera section 20 to acquire an image and stores the image in the RAM 11.

At step S2, the CPU 10 determines whether or not at least one pilot signal from the information transmission apparatus 2 has been detected from the image acquired by the camera section 20. If it is determined that at least one pilot signal has been detected, then the flow proceeds to step S3. If it is determined that no pilot signal has been detected, then the flow returns to step S1.

At step S3, the CPU 10 identifies the position at which information has been transmitted, based on the position at which the pilot signal has been detected.

At step S4, the CPU 10 performs an image acquisition operation again at a high frame rate as for the information transmission position part and at a low frame rate as for other parts. By increasing the frame rate for acquiring information, the amount of transmittable information is increased accordingly.

At step S5, various processings of the image data are performed by the signal processing circuit. At the same time, the CPU 10 extracts information overlapped with the information transmission position part. Hereinafter, this extracted information may be also referred to as extracted information.

At step S6, the CPU 10 generates visually recognizable picture information based on the extracted information, and then synthesizes and displays the acquired image and the extracted information. If the information synthesis position is near the pilot signal detection position, it is easy to grasp the relation between the subject image of each information transmission apparatus 2 and information transmitted by the information transmission apparatus 2 in the image. If GUI which highlights the information is displayed together with the information, it is instinctively understood that the information is synthesized information.

FIGS. 5A and 5B show that a picture taken by the information display apparatus 1 is displayed on the display section 13.

First, it is assumed that a user freely moves in a town with a portable information display apparatus 1 and captures an image of the front of a station and its vicinity with the camera section 20 of the information display apparatus 1 as shown in FIG. 5A. It is also assumed that the information display apparatus 1 could extract, from the image, information transmitted by an information transmission apparatus 2-1 which is the electronic signboard of a station, an information transmission apparatus 2-2 which is the electronic signboard of a restaurant and an information transmission apparatus 2-3 which is the electronic signboard of a cafe in a condition difficult to visually recognize.

Then, as shown in FIG. 5B, the information transmitted by each of the information transmission apparatuses 2-1 to 2-3 is synthesized near the information transmission position at which the information has been extracted. Here, on the display section 13, information 2-1-1 indicating the arrival time of a train is displayed near the information transmission position of the information transmission apparatus 2-1; information 2-2-1 indicating the opening time of a restaurant is displayed near the information transmission position of the information transmission apparatus 2-2; and information 2-3-1 indicating the opening time and the recommended menu item of a cafe is displayed near the information transmission position of the information transmission apparatus 2-3. The user can view the information obtained from the information transmission apparatuses 2 he saw in association with the information visually displayed by the information transmission apparatuses 2, and thereby he can quickly understand the meaning of the information.

<Second Embodiment>

It is also possible to devise to effectively display information transmitted by the information transmission apparatus 2 of the first embodiment so that the relation with the information transmission apparatus 2 which has transmitted the information can be apparently grasped.

For example, when information 2-3-1 indicating the opening time and the recommended menu item of a cafe is displayed near the information transmission position of the information transmission apparatus 2-3, a line L is drawn between the subject image of the information transmission apparatus 2-3 and the information 2-3-1, as shown in FIG. 6. Thereby, the relation between the information transmission source and the information is clarified, and it is useful especially when a lot of information is cumbersomely displayed.

Figure 7:
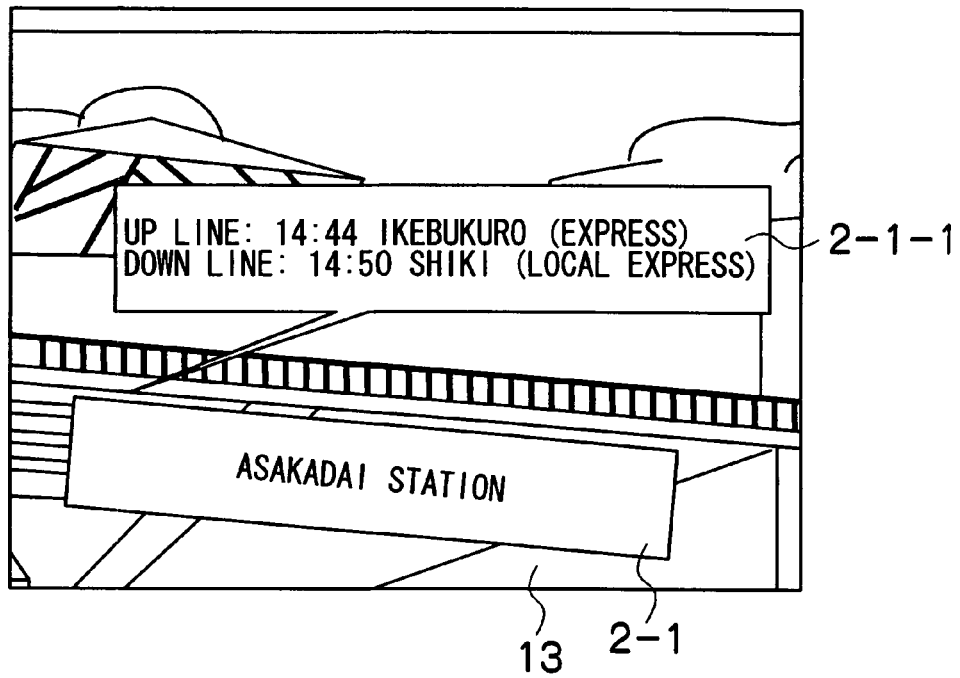
FIG. 7 is a diagram showing that relationship between the information transmission apparatus and information transmitted by the information transmission apparatus is visually recognizably displayed by a words frame.

Alternatively, the information 2-1-1 obtained from the information transmission apparatus 2-1 may be indicated by being surrounded by a words frame from the information transmission position of the information transmission apparatus 2-1, as shown in FIG. 7.

Figure 8:
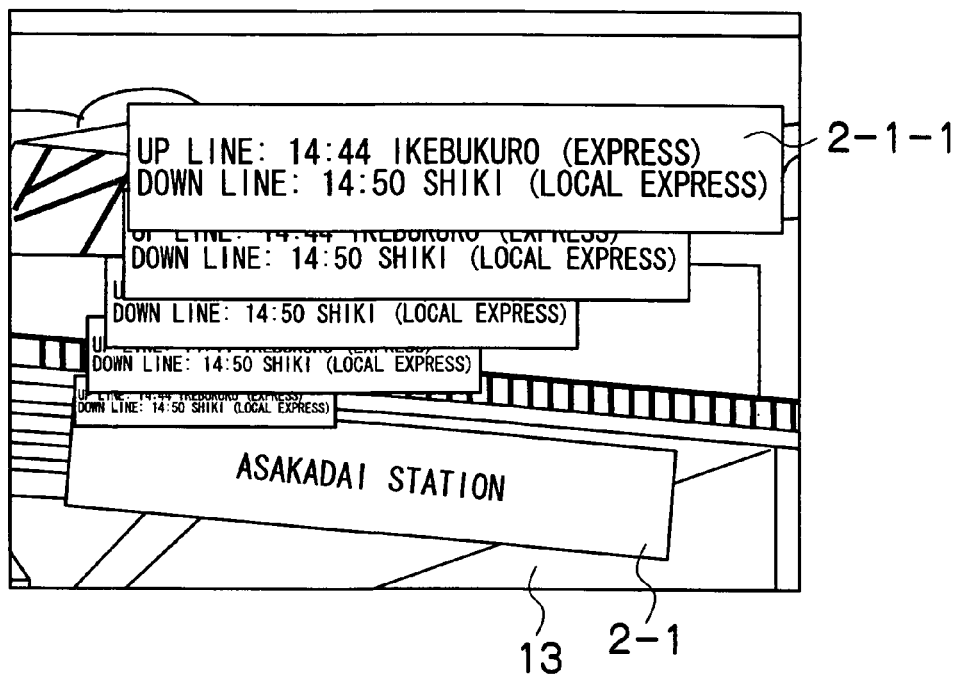
FIG. 8 is a diagram showing that relationship between the information transmission apparatus and information transmitted by the information transmission apparatus is visually recognizably displayed by gradual appearance display.

Alternatively, the information 2-1-1 obtained from the information transmission apparatus 2-1 may be displayed in a manner that the information gradually appears from the information transmission position of the information transmission apparatus 2-1, as shown in FIG. 8.

Figure 9B:
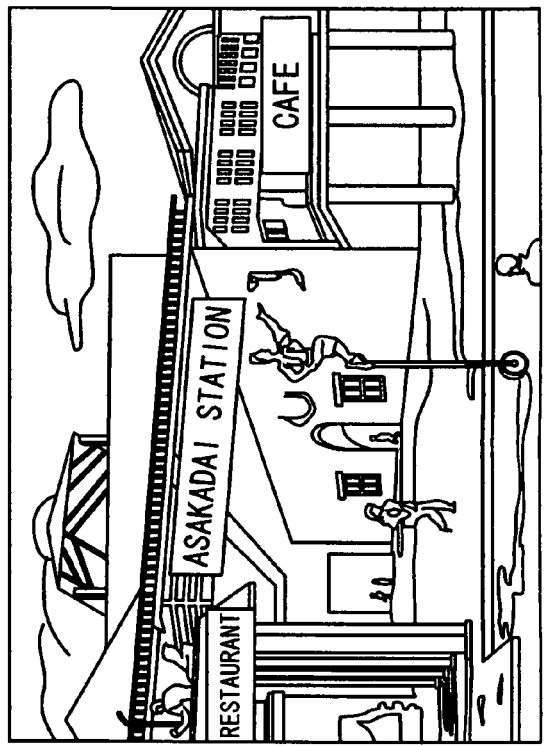
FIGS. 9A and 9B are diagrams showing that relationship between the information transmission apparatus and information transmitted by the information transmission apparatus is visually recognizably displayed by alternate display.
Figure 9A:
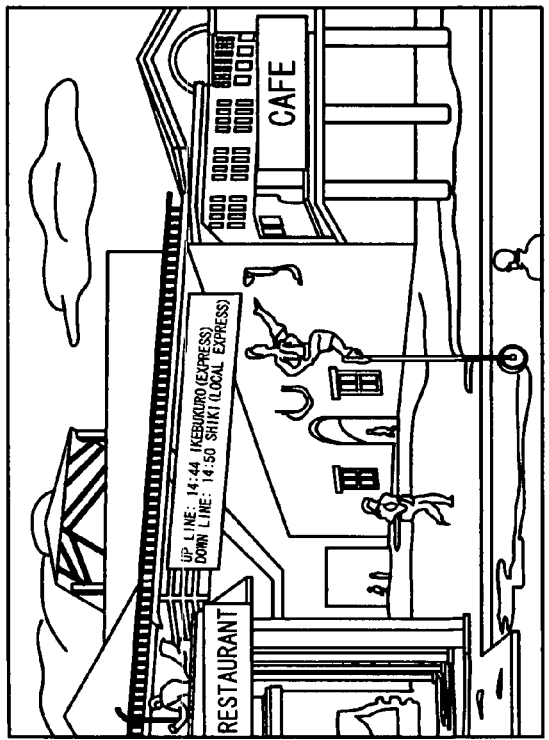

Alternatively, display in which the information 2-1-1 obtained from the information transmission apparatus 2-1 is superimposed on the information transmission position of the information transmission apparatus 2-1 and display in which it is not superimposed may be alternately switched with each other, as shown in FIGS. 9A and 9B.

Furthermore, it is also possible that a user arbitrarily sets the display method as described above, and the information is displayed in association with the information transmission apparatus 2 in the set method.

Figure 10:
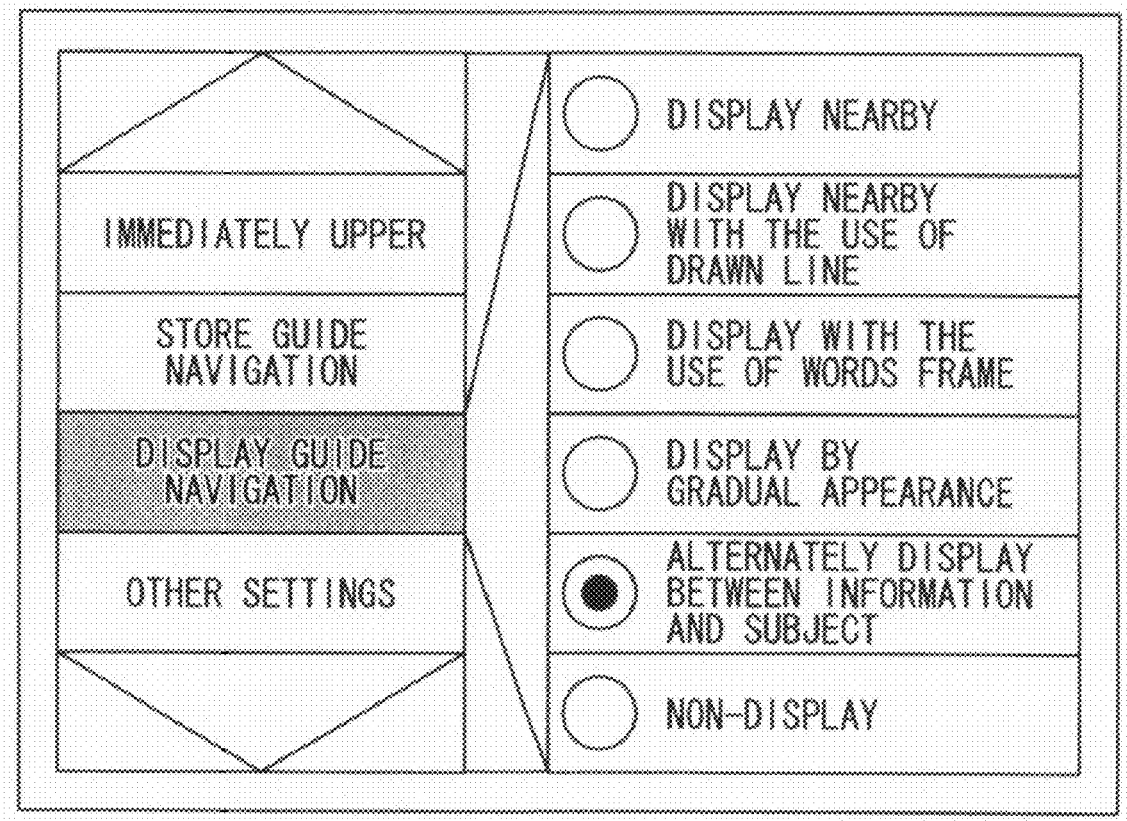
FIG. 10 is a diagram showing an example of a display method setting screen.

First, the information display apparatus 1 causes the user to select which method is to be used to display information in advance on the display method setting screen as shown in FIG. 10. Here, any one display method can be selected from among "display nearby" (see FIG. 5B), "display nearby with the use of drawn line" (see FIG. 6), "display with the use of words frame" (see FIG. 7), "gradual appearance display (see FIG. 8), "alternately display between information and subject" (see FIGS. 9A and 9B) and "non-display" for not displaying information.

Figure 11:
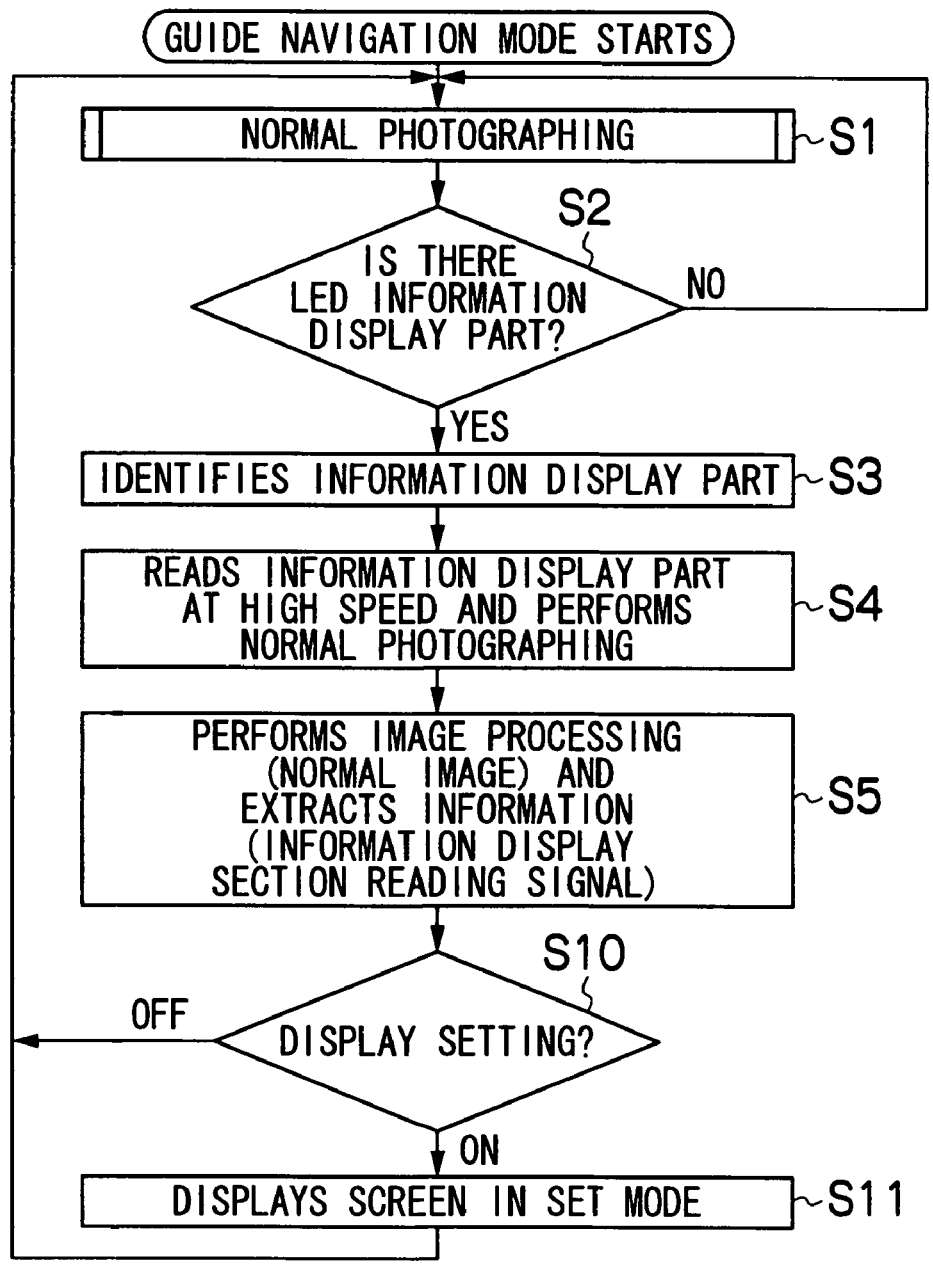
FIG. 11 is a flowchart showing the flow of guide navigation mode processing according to a second embodiment.

FIG. 11 is a flowchart showing the flow of the guide navigation mode processing executed by the information display apparatus 1.

Steps S1 to S5 are similar to those in the first embodiments. However, at step S10, it is determined whether any display method has been set on the display method setting screen. If any display method is set, the flow proceeds to step S11, where information is displayed in the set display method. If no display method is set, the flow returns to step S1.

As described above, it is possible to display the picture and the information of the information transmission apparatus 2 in association with each other in a form a user desires.

<Third Embodiment>

There may be a case where a user once acquires information from the information transmission apparatus 2 and wants to record the information in the information display apparatus 1. In this case, if it is possible to record the information in a recording form he desires, it is easy to arrange acquired information.

For example, a recording form in which a picture obtained by synthesizing an image taken by the camera 20 and information is recorded as an image or a recording form in which the taken image and the information are separately recorded are given as examples.

Figure 12:
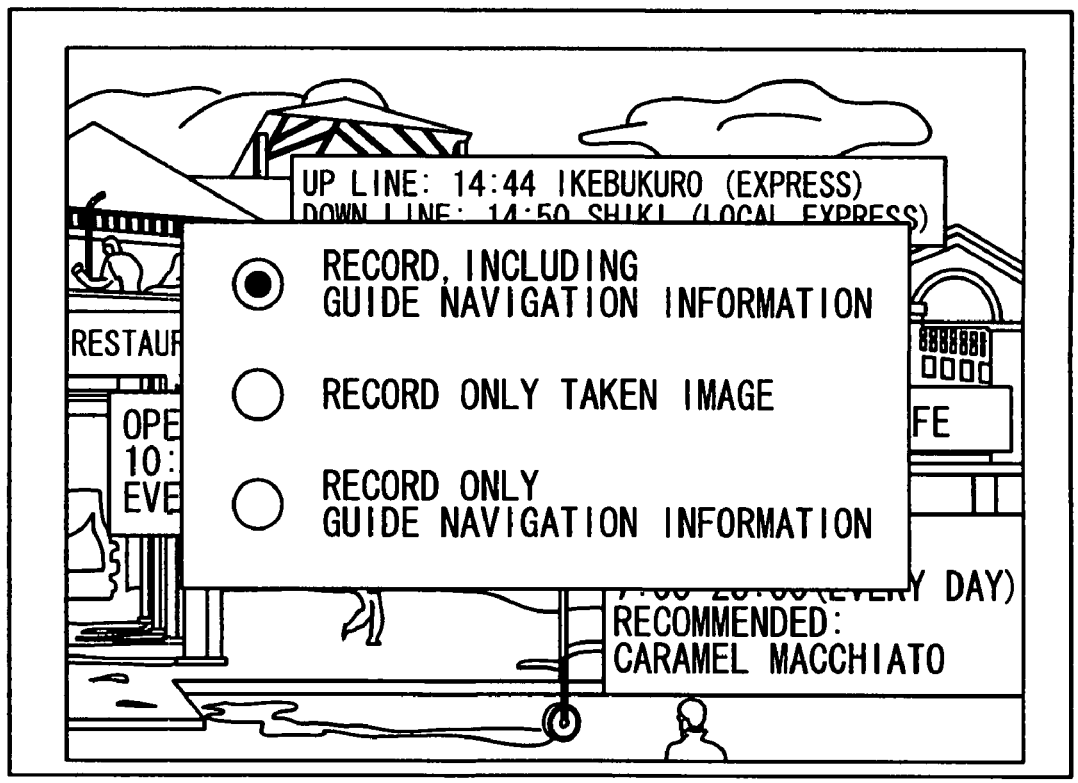
FIG. 12 is a diagram showing an example of a recording method setting screen displayed when photographing is performed.

A user selects which method is to be used to record information in advance on the recording method setting screen as shown in FIG. 12. Here, the user can select any one of "record, including guide navigation information" for recording a picture obtained by synthesizing a taken image and information as an image, "record only taken image" for recording only a taken image and "record only guide navigation information" for recording only information obtained from the information transmission apparatus 2.

The recording method setting screen is displayed when the photographing key is pressed while a live image is displayed on the display section 13. In this case, it is possible to, after freezing the live image obtained when the photographing key is pressed, that is, displaying an image to be recorded, synthesize the image with the recording method setting screen.

Figure 13:
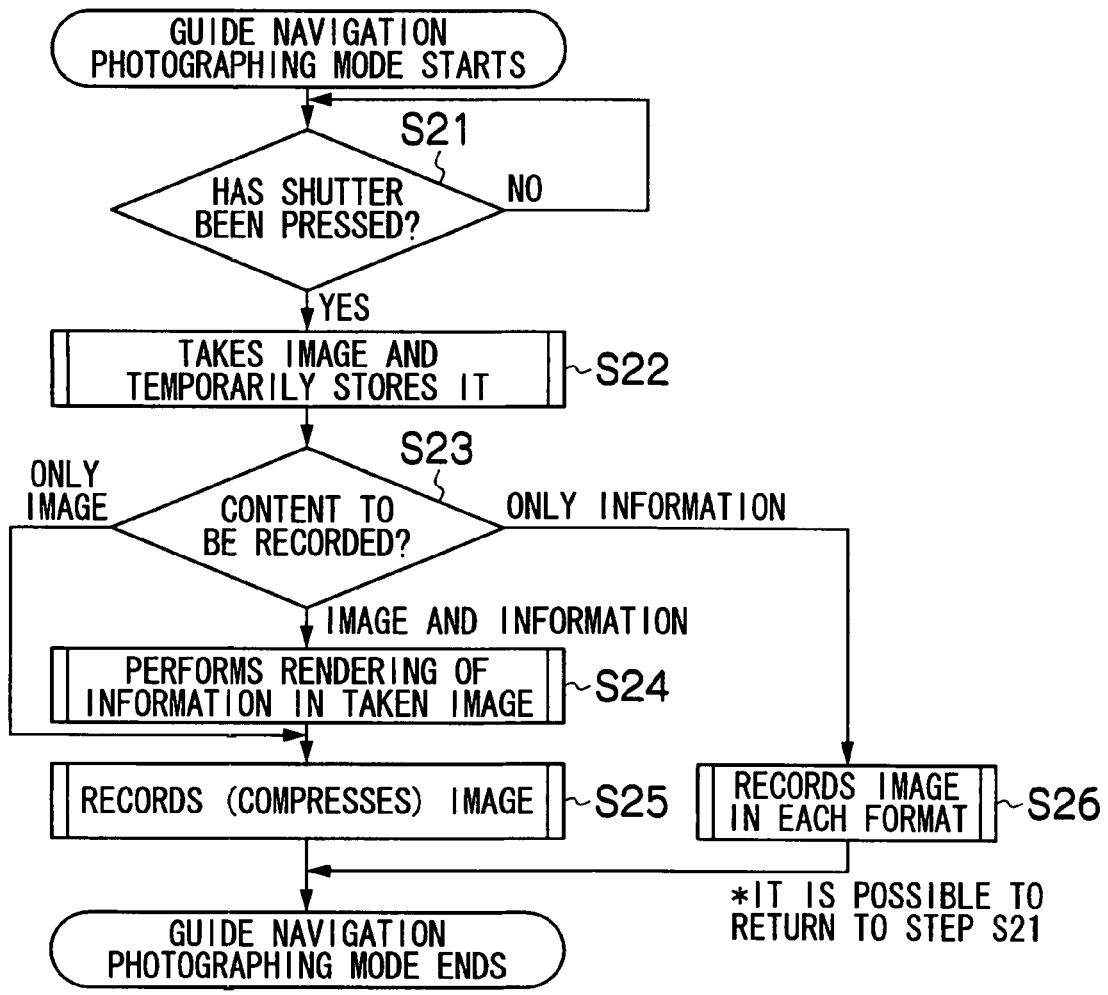
FIG. 13 is a flowchart showing the flow of guide navigation photographing mode processing according to a third embodiment.

FIG. 13 is a flowchart showing the flow of the guide navigation photographing mode processing executed by the information display apparatus 1.

At step S21, it is determined whether the photographing key has been pressed or not. If the photographing key has been pressed, the flow proceeds to step S22.

At step S22, an image acquisition operation is started. An image obtained from the camera section 20 is stored in the RAM 11.

At step S23, the recording method setting screen is displayed, and setting of a recording method is accepted via this screen. It is determined whether the recording method set on the recording method setting screen is "record, including guide navigation information", "record only taken image" or "record only guide navigation information". If "record, including guide navigation information" is set, the flow proceeds to step S24. If "record only taken image" is set, the flow proceeds to step 25. If "record only guide navigation information" is set, the flow proceeds to step S26.

At step S24, picture information generated from extracted information is synthesized near the position corresponding to the information transmission position in the image. The synthesized image is stored in the RAM 11.

At step S25, the image in the RAM 11 is compressed in a predetermined format and recorded in the memory card 27.

At S26, information received from each information transmission apparatus 2 is recorded in a format suitable for the kind of the information (for example, as a text file if the information includes only a document). The image may be separately recorded. After step S26 ends, the flow may return to step S21.

According to the above processing, it is possible to record, according to the recording format set by the user, only the information obtained from the information transmission apparatus 2, an image in which the image of the information transmission apparatus 2, from which the information has been acquired, is associated, only the image, or the image and the information separately.

When freely moving in a town with the portable information display apparatus 1, the user can set "record, including guide navigation information" in the case of desiring to record both of information captured from the information transmission apparatus 2 with the camera section 20 of the information display apparatus 1 and the scenery he sees now as image data, "record only taken image" in the case of desiring to record only the image like a souvenir picture because the information obtained from the information transmission apparatus 2 is unnecessary, and "record only guide navigation information" in the case of recording the information itself which has been obtained from the information transmission apparatus 2.

<Fourth Embodiment>

In the third embodiment, it is troublesome that setting of a recording format is required each time the photographing key is pressed. Therefore, by keeping a recording format set in advance is kept until it is changed, an image or information may be recorded in accordance with the kept recording format.

Figure 14:
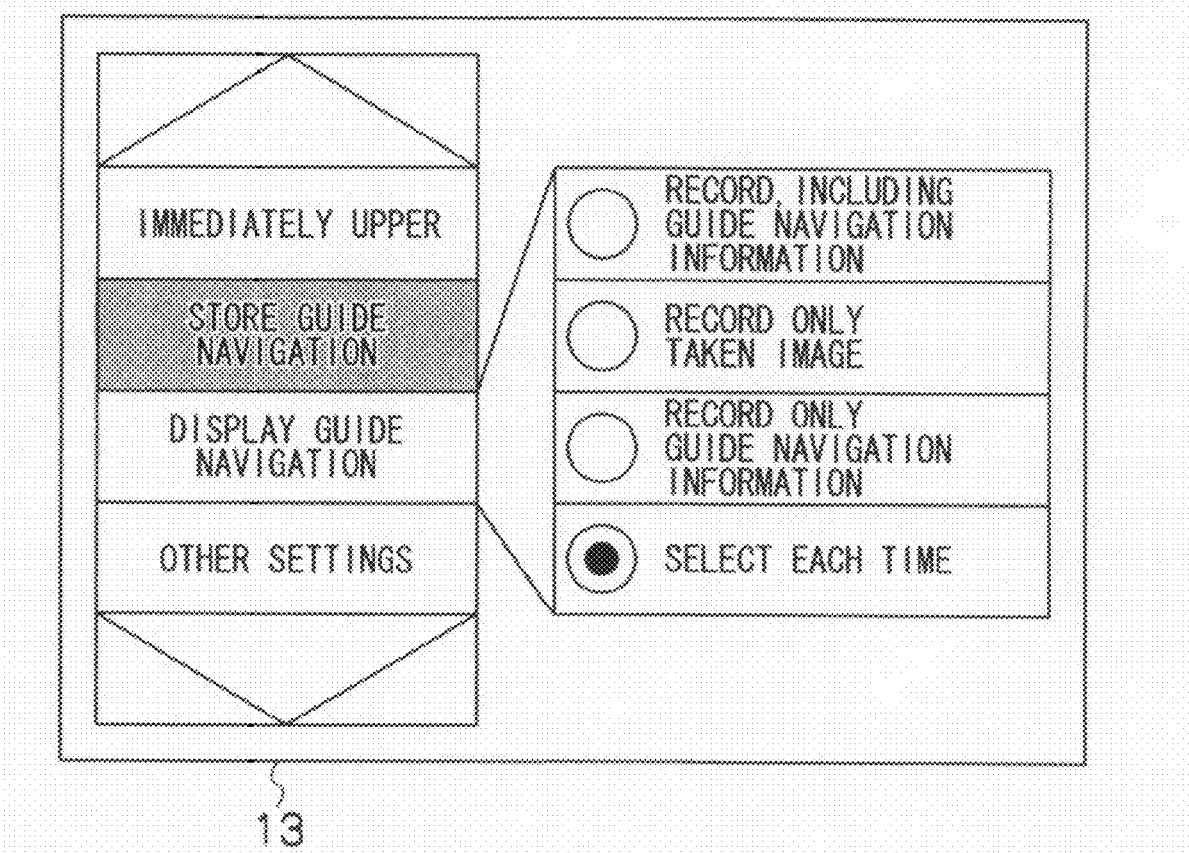
FIG. 14 is a diagram showing an example of a recording method setting screen displayed as a part of setting items.

For example, "store guide navigation", an item for setting a recording format, is added as one of the setting items for various operations of the information display apparatus 1, as shown in FIG. 14. When this "store guide navigation" item is selected, a recording method setting screen similar to that in FIG. 10 is displayed in parallel to the setting items. However, the recording method setting screen here is provided with a setting item "select each time". When this setting item is selected, the recording method setting screen is displayed each time the photographing key is pressed similarly to the third embodiment.

Figure 15:
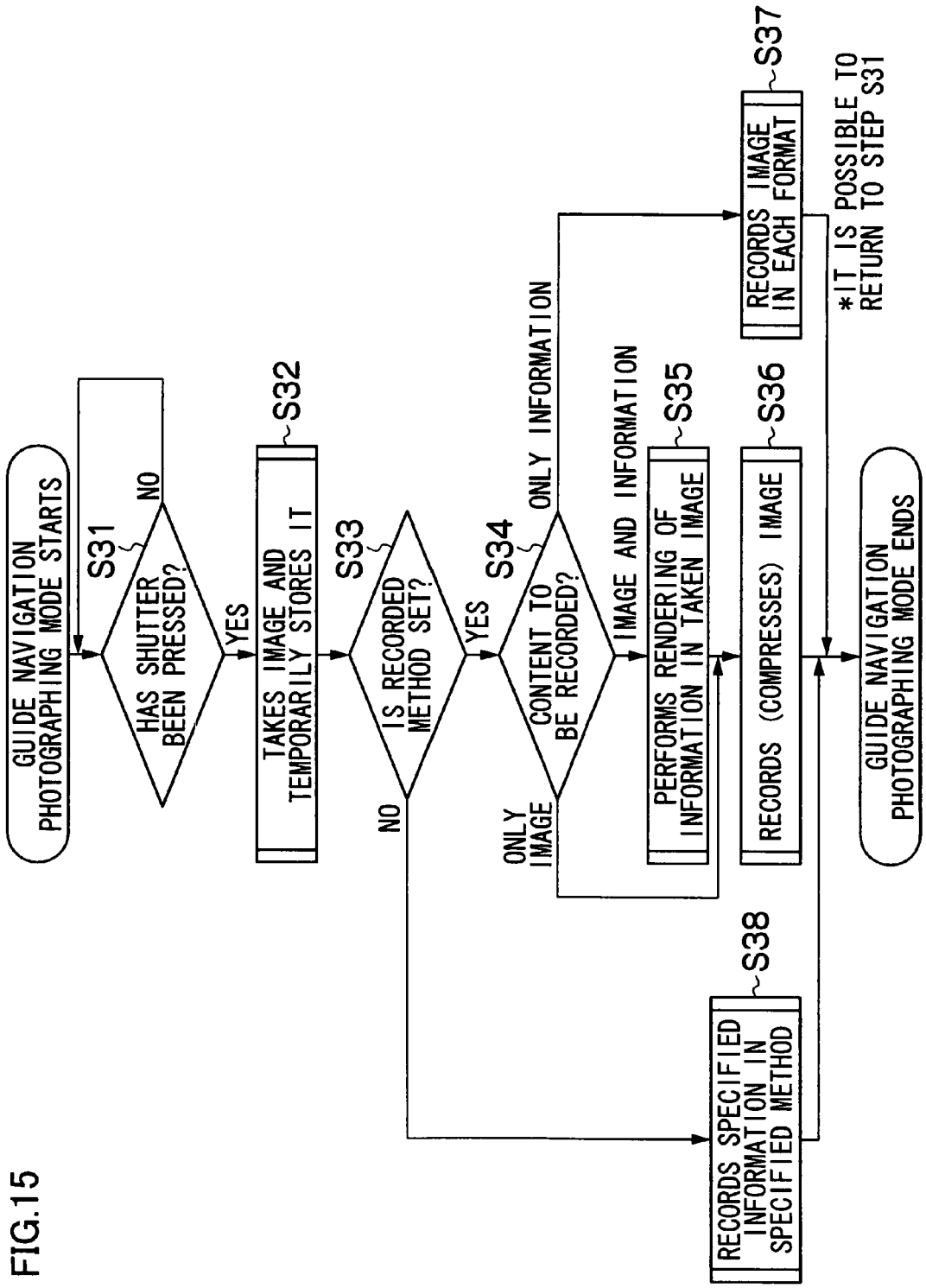
FIG. 15 is a flowchart showing the flow of guide navigation photographing mode processing according to a fourth embodiment.

FIG. 15 is a flowchart showing the flow of the guide navigation photographing mode processing executed by the information display apparatus 1.

At step S31, it is determined whether the photographing key has been pressed or not. When the photographing key has been pressed, the flow proceeds to step S32.

At step S32, an image acquisition operation is started. An image obtained from the camera section 20 is stored in the RAM 11.

At step S33, it is determined whether or not a recording method has been set on the recording method setting screen.

If a recording method is set, the flow proceeds to step S34. Otherwise, the flow proceeds to step S38.

At step S34, it is determined whether the recording method set on the recording method setting screen is "record, including guide navigation information", "record only taken image", "record only guide navigation information" or "select each time". If "record, including guide navigation information" is set, the flow proceeds to step S35. If "record only taken image" is set, the flow proceeds to step S36. If "record only guide navigation information" is set, the flow proceeds to step S37.

At step S35, a picture of information received from each information transmission apparatus 2 is synthesized near the information transmission position in the image stored in the RAM 11 and stored in the RAM 11.

At step S36, the image in the RAM 11 is compressed in a predetermined format and recorded in the memory card 27.

At S37, information received from each information transmission apparatus 2 is recorded in a format suitable for the kind of the information (for example, as a text file if the information includes only a document). The image may be separately recorded. After step S37 ends, the flow may return to step S31.

At step S38, selection of extracted information to be recorded and selection of a recording format of the selected, extracted information are individually accepted, and the selected, extracted information is individually recorded in the selected recording format. This operation is similar to that performed at step S23.

According to the above processing, it is possible to set a recording method in advance so that selection of a recording method is not required each time the photographing key is pressed or to select a recording method each time the photographing key is pressed.

<Fifth Embodiment>

The information transmission apparatus 2 of the present invention can be effectively used not only within the scope of daily-life activities as in the first to fourth embodiments but also when it is installed at a sightseeing spot or in an art museum. In general, a sightseeing map, an explanation diagram of a monument and the like are provided at a sightseeing spot. However, there may be a case where description about a target object may not be seen because of a lot of people around it.

Figure 16:
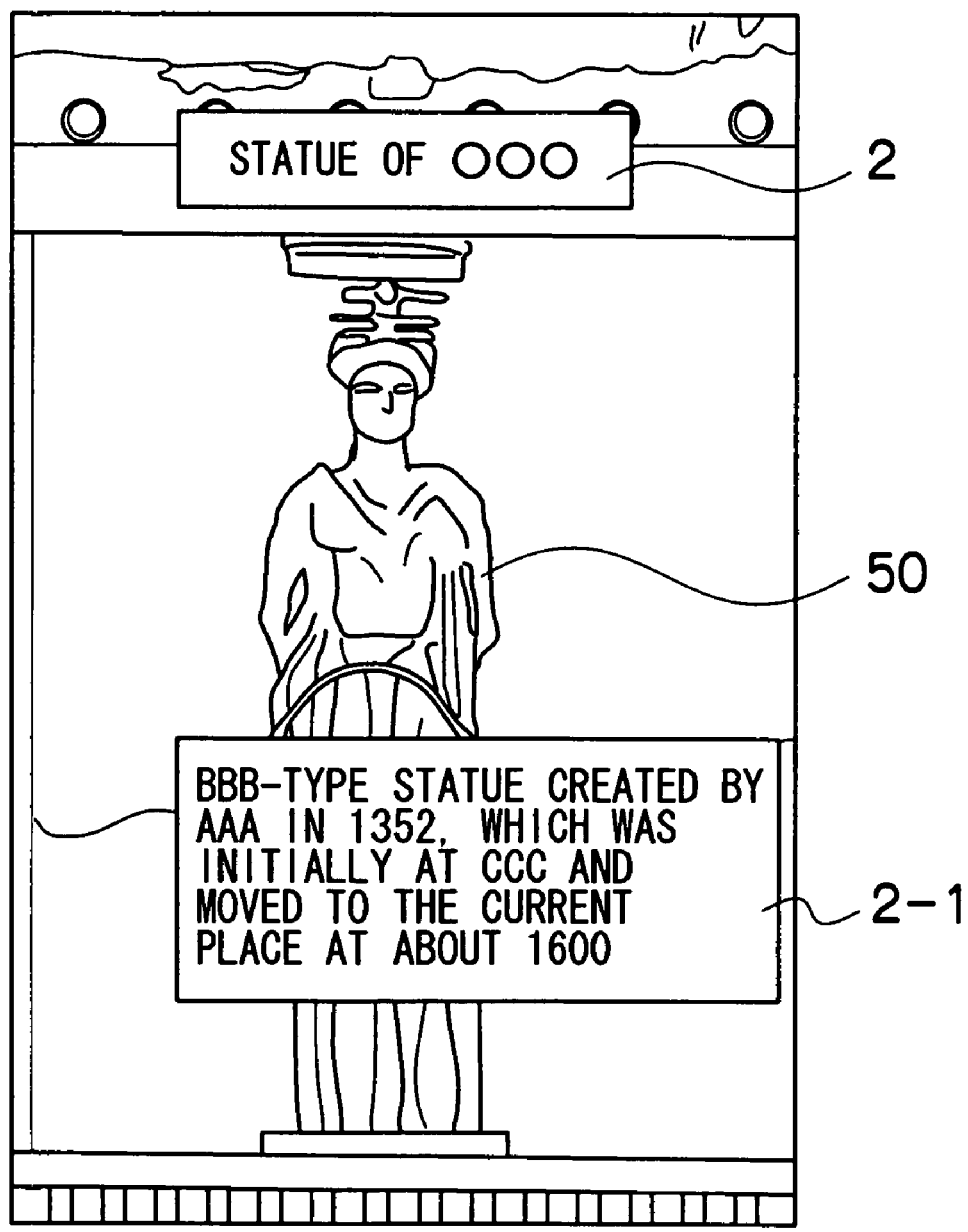
FIG. 16 is a diagram showing that description of a target object is displayed on the information display apparatus by optically transmitting information including the description of the target object from the information transmission apparatus installed near the target object.

Therefore, as shown in FIG. 16, information 2-1 which includes description of a target object 50 is optically transmitted from an information transmission apparatus 2 installed near the target object 50 such as a sightseeing map or a monument. A user moves to a position where he can see the target object 50, carrying the information display apparatus 1, and receives the information 2-1 by capturing the target object 50 with the camera section 20 of the information display apparatus 1, and he can sufficiently read the information displayed on the display section 13 at his hand and understand the target object 50 well.

In this case, because the picture of the target object 50 displayed as a live image on the display section 13 and the information 2-1 are overlapped with each other, it may be difficult to view them. In the case of desiring to record the picture as a souvenir picture as in the third embodiment, the information 2-1 will be an interference.

Therefore, the display position of the information 2-1 on the display section 13 is moved to any desirable position in response to an operation of the operation section 14, as shown in FIGS. 17A to 17C.

For example, suppose that the information 2-1 is displayed at a position near the information transmission apparatus 2, being overlapped with the target object 50 as shown in FIG. 17A.

In this case, the information 2-1 to be moved is first selected via the operation section 14 as shown in FIG. 17B. When the selection is determined, the information 2-1 is highlighted by a bold frame, blinking or semi-transparency.

When the direction specification switch of the operation section 14 is pressed in this condition, the display position of the information 2-1 moves in response to the pressing, as shown in FIG. 17C. FIG. 17C shows that movement from the upper part of the display section 13 to the lower part is caused.

It is desirable that highlighted display during the condition that information is selected and highlighted display during movement are different in order to understandably indicate that information is being moved. For example, it is desirable to set red as the frame color when the information 2-1 is selected in FIG. 17B, and set blue as the frame color when the information 2-1 is moving in FIG. 17C.

When the movement to a desired position is completed, the operation of the operation section 14 is stopped, and display of the target object 50 and display of the information 2-1 can be prevented from being interfered with each other.

Figure 18:
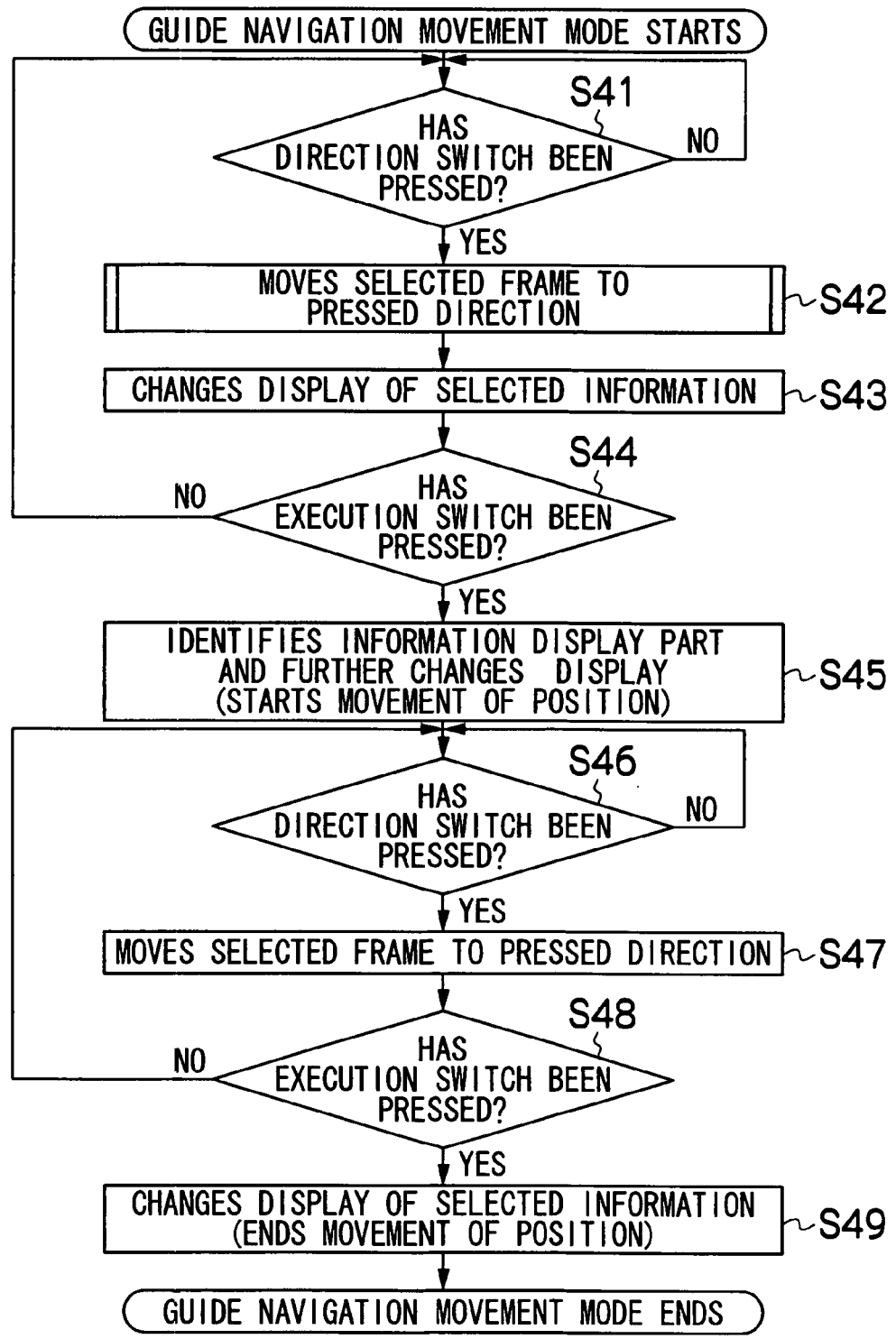
FIG. 18 is a flowchart showing the flow of guide navigation movement mode processing.

FIG. 18 is a flowchart showing the flow of the guide navigation movement mode processing by the information display apparatus 1.

First, at step S41, it is determined whether or not the information 2-1 to be moved has been selected by the direction specification switch of the operation section 14. When the information 2-1 has been selected, the flow proceeds to step S42.

At step S43, the display format of the selected information 2-1 is changed so that it is understandably displayed. For example, the information 2-1 can be highlighted by surrounding it by a bold frame, blinking it or making it semi-transparent.

At step S44, by pressing the execution switch of the operation section 14 while the information 2-1 is selected, it is determined whether or not the selection of the information 2-1 to be moved has been determined. When the selection of the information 2-1 has been determined, the flow proceeds to step S45. Otherwise, the flow returns to step S41.

At step S45, the display format of the selected information 2-1 is further changed. For example, the color of the display frame may be changed; the blinking cycle may be changed; or the degree of semi-transparency of the information 2-1 may be changed. Thereby, it is indicated that the information 2-1 to be moved has been determined.

At step S46, by pressing the direction specification switch of the operation section 14 while the information 2-1 is selected, it is determined whether the movement destination of the information 2-1 has been specified or not. If the movement direction of the information 2-1 has been specified, then the flow proceeds to step S47.

At step S47, the display frame for surrounding the information 2-1 on the display section 13 is moved from the current position to the movement destination specified by the operation section 14. Because only the frame is moved prior to movement of the information 2-1, the trouble of having to re-move the information 2-1 again because of incorrect movement of the information 2-1 does not easily occur.

At step S48, by pressing the execution switch of the operation section 14, it is determined whether or not the movement destination of the display frame has been determined as the movement destination of the information 2-1. If the movement destination of the information 2-1 is determined, then the flow proceeds to step S49. Otherwise, the flow returns to step S46.

At step S49, the display position of the information 2-1 is moved to the position of the frame moved in advance.

After being moved, the information 2-1 can be moved as many times as needed by pressing the direction switch any number of times.

<Sixth Embodiment>

When "record, including guide navigation information" is set as in the third embodiment, information is recorded together unless the setting is changed even in the case of desiring to immediately recording only the subject as an image. Therefore, it is conceivable that a good photo opportunity is missed because of the time required for changing the setting. There may be also a case that the display of information from the information transmission apparatus 2 as in the first to fifth embodiments is interfering itself.

Therefore, this embodiment makes it possible to select both of display/non-display of information and recording/non-recording of information at a time.

Figure 19:
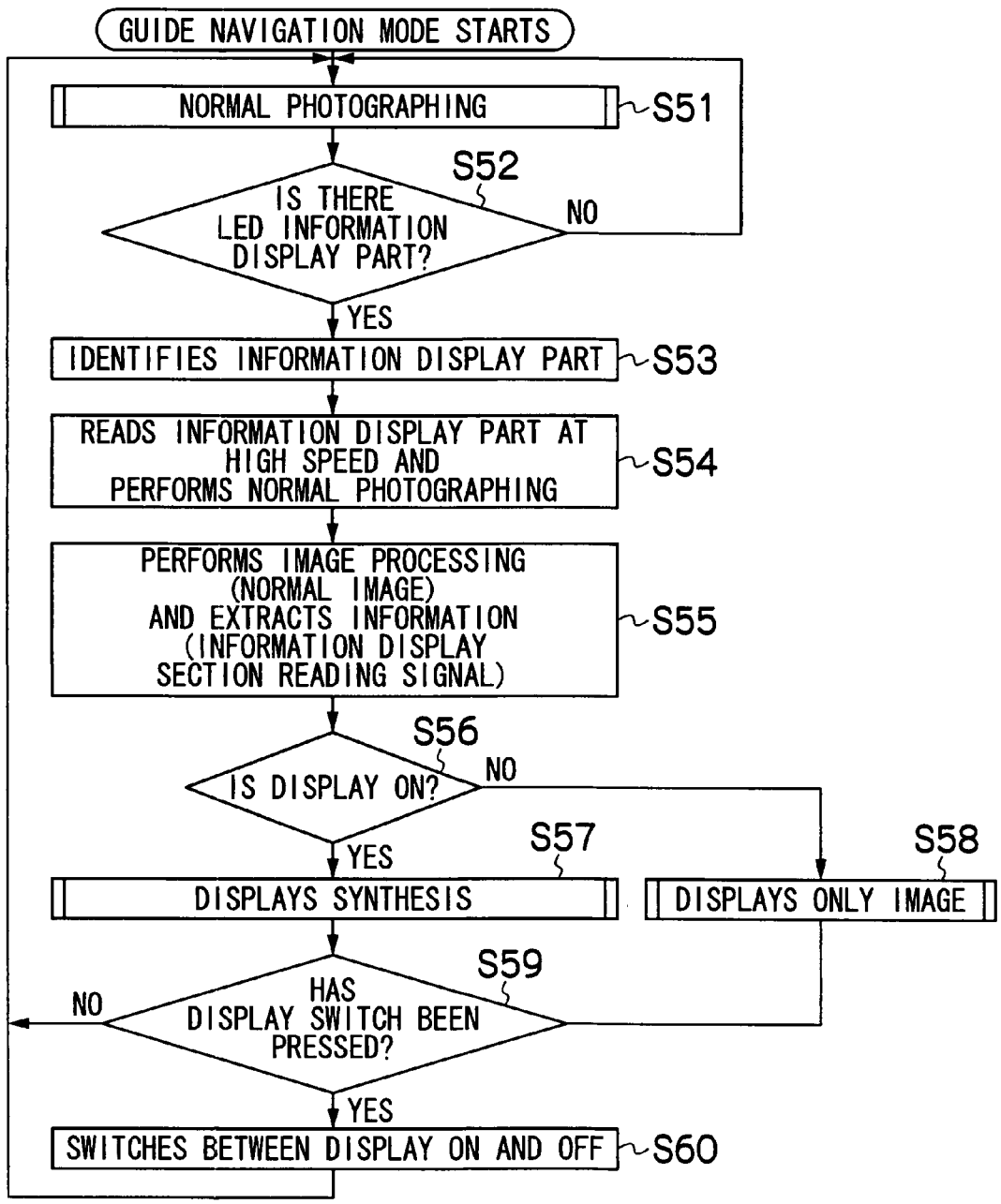
FIG. 19 is a flowchart showing the flow of guide navigation mode processing according to a sixth embodiment.

FIG. 19 is a flowchart showing the flow of the guide navigation mode processing by the information display apparatus 1.

Since steps S51 to S55 are similar to steps S1 to S5, description thereof will be omitted.

At step S56, selection about whether or not to display information is accepted from the operation section 14. If display of information is selected, the flow proceeds to step S57. If non-display of information is selected, the flow proceeds to step S58.

At step S57, an acquired image and a picture of extracted information are synthesized and displayed.

At step S58, information is not synthesized, and an acquired image is displayed.

At step S59, it is determined whether or not the display switch of the operation section 14 has been pressed to direct display of the information. If display of the information has been directed, the flow proceeds to step S60. Otherwise, the flow returns to step S51.

At step S60, display and non-display of the information are switched. That is, if a through image and information are synthesized and displayed at step S57, then the synthesis of the information is stopped. If a through image is displayed without the information being synthesized at step S58, then the information and the live image are synthesized and displayed.

FIGS. 20A and 20B show that display and non-display of the information are switched. If the display switch 14a of the operation section 14 is pressed when the information 2-1 is displayed being synthesized with a through image as shown in FIG. 20A, then the information is displayed without being synthesized with the through image as shown in FIG. 20B.

On the other hand, if the display switch 14a is pressed when the information is displayed without being synthesized with the through image as shown in FIG. 20B, then the information 2-1 is displayed being synthesized with the through image as shown in FIG. 20A.

In this way, display and non-display of the information 2-1 can be easily switched each time the display switch 14a is pressed.

When the photographing key is pressed, the image with the information being synthesized therewith or the image without information being synthesized therewith is recorded in accordance with the specification of display or non-display of the information. In this case, the recording format set on the recording method setting screen is ignored, and recording in the format in accordance with the specification of display or non-display of information by the display switch 14*a* is given preference.

<Seventh Embodiment>

The information transmission apparatus 2 can be installed on various objects if the structure thereof is not so big as a signboard.

For example, as shown in FIG. 21A, the information transmission apparatus 2 may be configured by a member which transmits visible information from a body of an athlete such as a soccer player and which does not interfere with the game, for example, an electronic number plate configured by LED's. The information stored in the information storage section 34 of the information transmission apparatus 2 is assumed to be information specific to each athlete, such as the athlete's name, the team he belongs to and the position.

When a user brings the information display apparatus 1 to a stadium with him and captures and displays, on the display section 13, a target athlete in the angle of field of the camera section 20, information received from information transmission apparatuses 2-1 to 2-3 attached to respective athletes, for example, the names 2-1-1 to 2-3-1 of three athletes 60-1 to 60-3 are displayed near the athletes 60-1 to 60-3 in a live image, as shown in FIG. 21B. The user can see information about each athlete with the portable information display apparatus 1 at his hand while watching the game, and therefore, he can know well what kind of person each athlete is and enjoy the game more.

Figure 22:
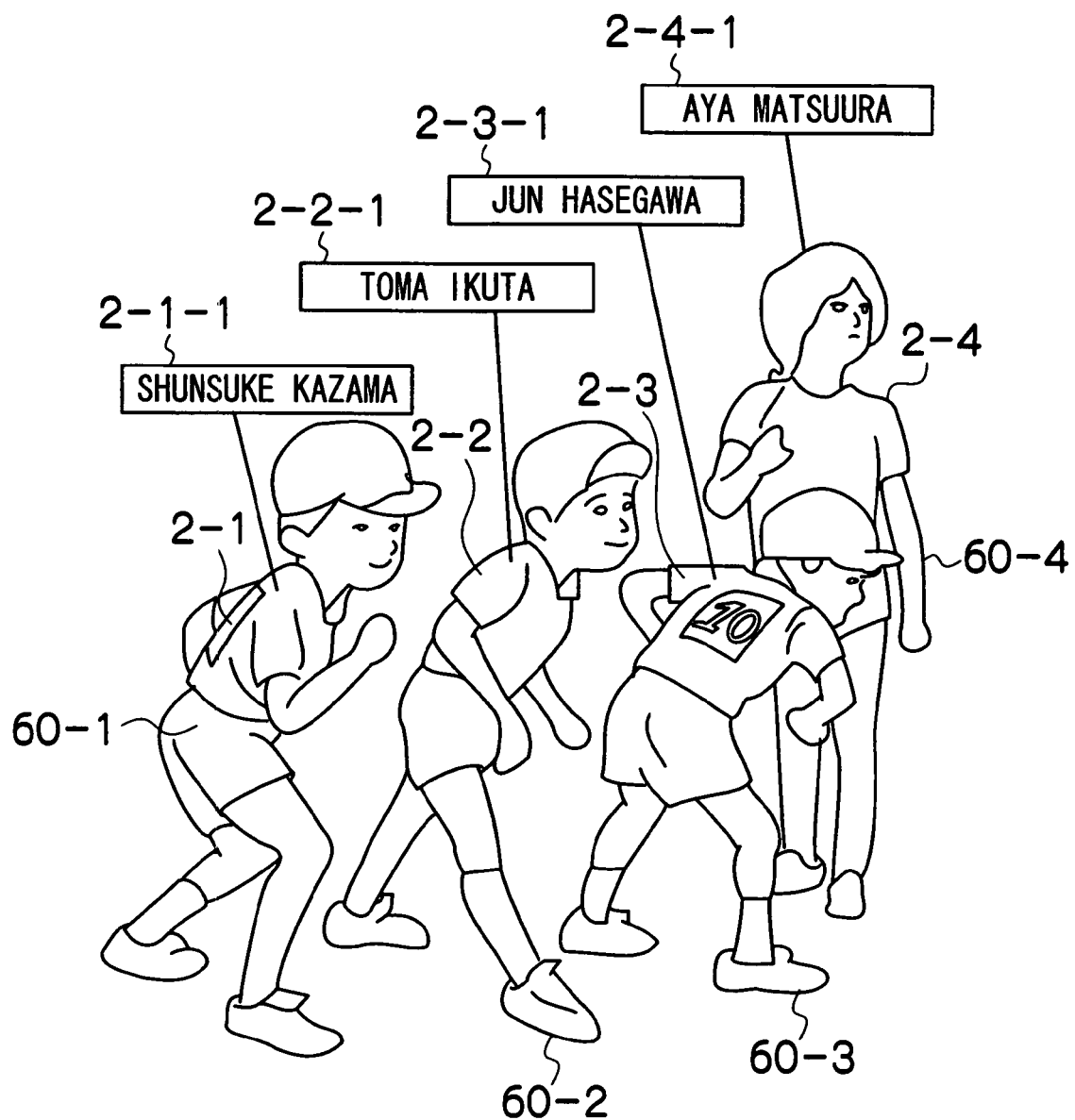
FIG. 22 is a diagram showing that information transmitted from the information transmission apparatus attached to an athlete is displayed on the information display apparatus.

Alternatively, it is also possible that, as shown in FIG. 22, the information transmission apparatuses 2 configured in a manner so that it does not interfere with the game are attached to children participating in a sports meet to transmit information such as their names.

However, there is a possibility that, during a game or a race, the information transmission apparatuses 2 blink and interfere with the race or the game. Not only in this case but also in any case where visible light is not suitable, it is desirable to transmit information with light beyond the visible range such as infrared light, especially near-infrared light. If near-infrared light is used, a receiving apparatus can be configured by a common image-taking apparatus without any change or with a slight modification, and this is a cost advantage. Furthermore, since near-infrared light can be a slightly visible, visual check of the operation of the information provision system can be easily performed.

<Eighth Embodiment>

Figure 23:
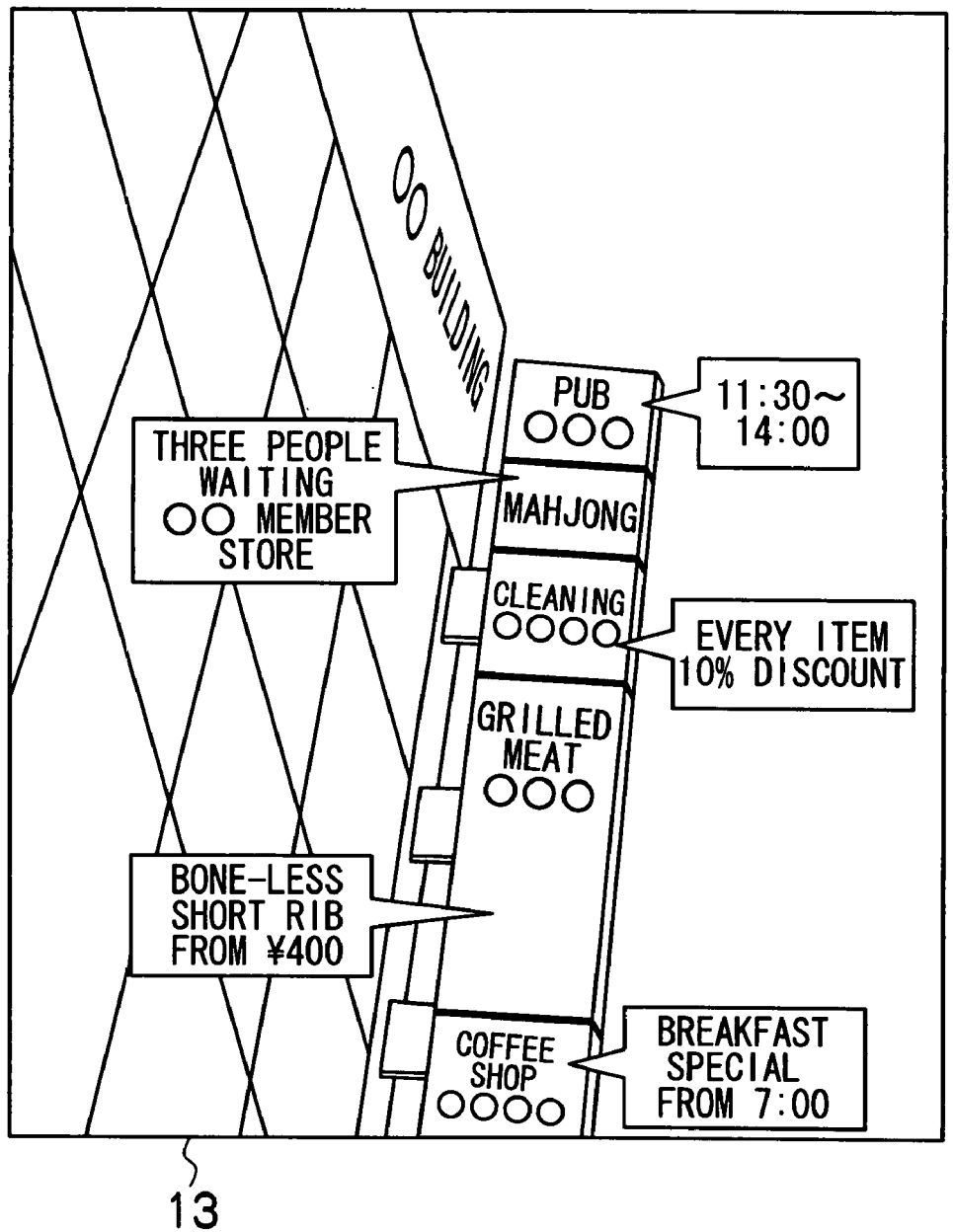
FIG. 23 is a diagram showing that a lot of extracted information is displayed at a time.

As shown in FIG. 23, if a user moves to a place where a lot of information transmission apparatuses 2 exist, carrying the information display apparatus 1, and captures the information transmission apparatuses 2 around the current position in the angle of field of the camera section 20, each of the lot of information transmission apparatuses 2 independently and separately transmits information from its display section 31 to the information display apparatus 1 without any restriction. In this case, a lot of extracted information is displayed on the display section 13 of the information display apparatus 1 at a time, or it is difficult to display all the information there. Seeing such display, the user is confused, and a lot of time is required to obtain information he needs.

In consideration of this problem, this embodiment makes it possible to sort out and arrange only information that a user really needs from among information randomly provided from a lot of information transmission apparatuses 2 and display the information on the information display apparatus 1.

That is, to information stored in the information storage section 34 of the information transmission apparatus 2, genre information indicating the classification of the information is added, and the display control section 32 reads the information stored in the information storage section 34 and the genre information added to (or corresponding to) the information in response to an instruction to start display of the information, and provides it for the display control section 32. The display control section 32 continuously transmits both of the information read from the information storage section 34 and the genre information added to the information, from the display section 31 as optical signals difficult to visually recognize.

When the user points the camera section 20 of the information display apparatus 1 at a desired display section 31, visible information of the information transmission apparatus 2 is displayed on the display section 13 as a picture. At the same time, the information display apparatus 1 acquires the information transmitted from the display section 31 and genre information added to the information with the camera section 20, classifies each information based on the genre information added to the information and once stores the classification result in the RAM 11.

Meanwhile, the CPU 10 of the information display apparatus 1 accepts in advance designation of a desired genre about which the user wants to display information by operation of the operation section 14.

Figure 24:
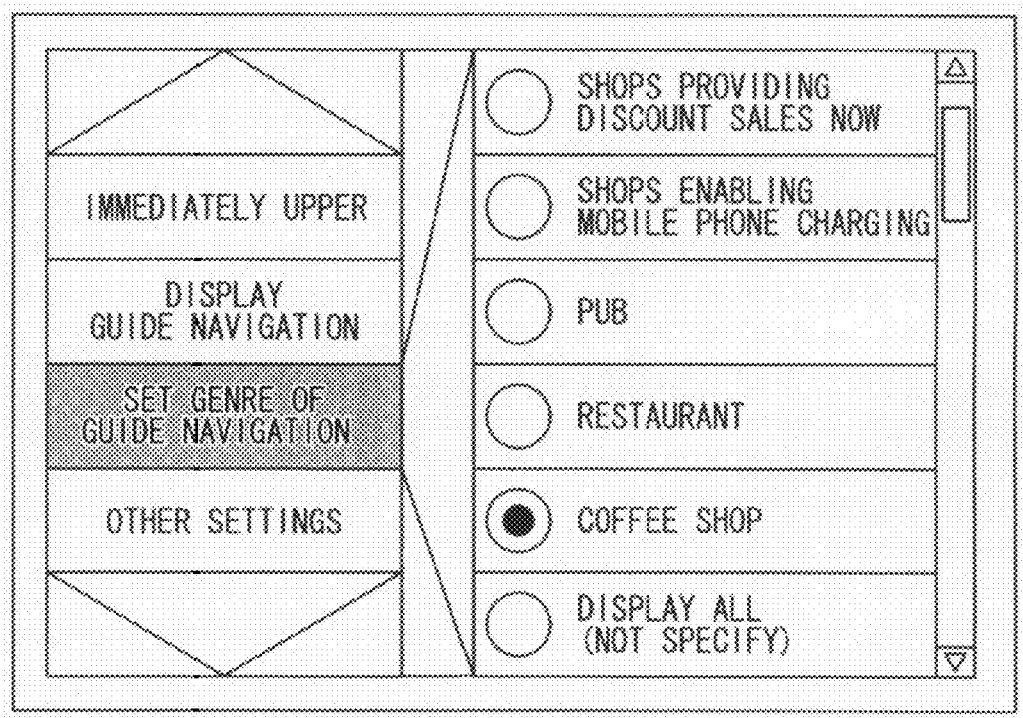
FIG. 24 is a diagram showing an example of a genre selection screen.

FIG. 24 shows an example of a genre selection screen for accepting designation of a genre desired by a user. This screen appears by selecting "guide navigation genre setting", one of the setting items in FIG. 14. The information display apparatus 1 causes the user to select which genre among the genres (such as "shops providing discount sales now" and "shops enabling mobile phone charging") displayed on the genre selection screen he wants to display information about. Designation of the genre indicated by "display all (not specify)" means designation of all the genres.

The genres which can be selected on the genre selection screen are not limited to those shown in FIG. 24, and genres such as "eating and drinking places with vacant seats" and "eating and drinking places allowing smoking" are also possible. In short, any genres are possible if they cover all genres corresponding to the genre information of the information transmission apparatus 2.

The CPU 10 extracts information to which genre information, among information stored in the RAM 11, corresponding to any genre specified by the user from the genre selection screen is added and displays the extracted information on the display section 13.

Figure 25:
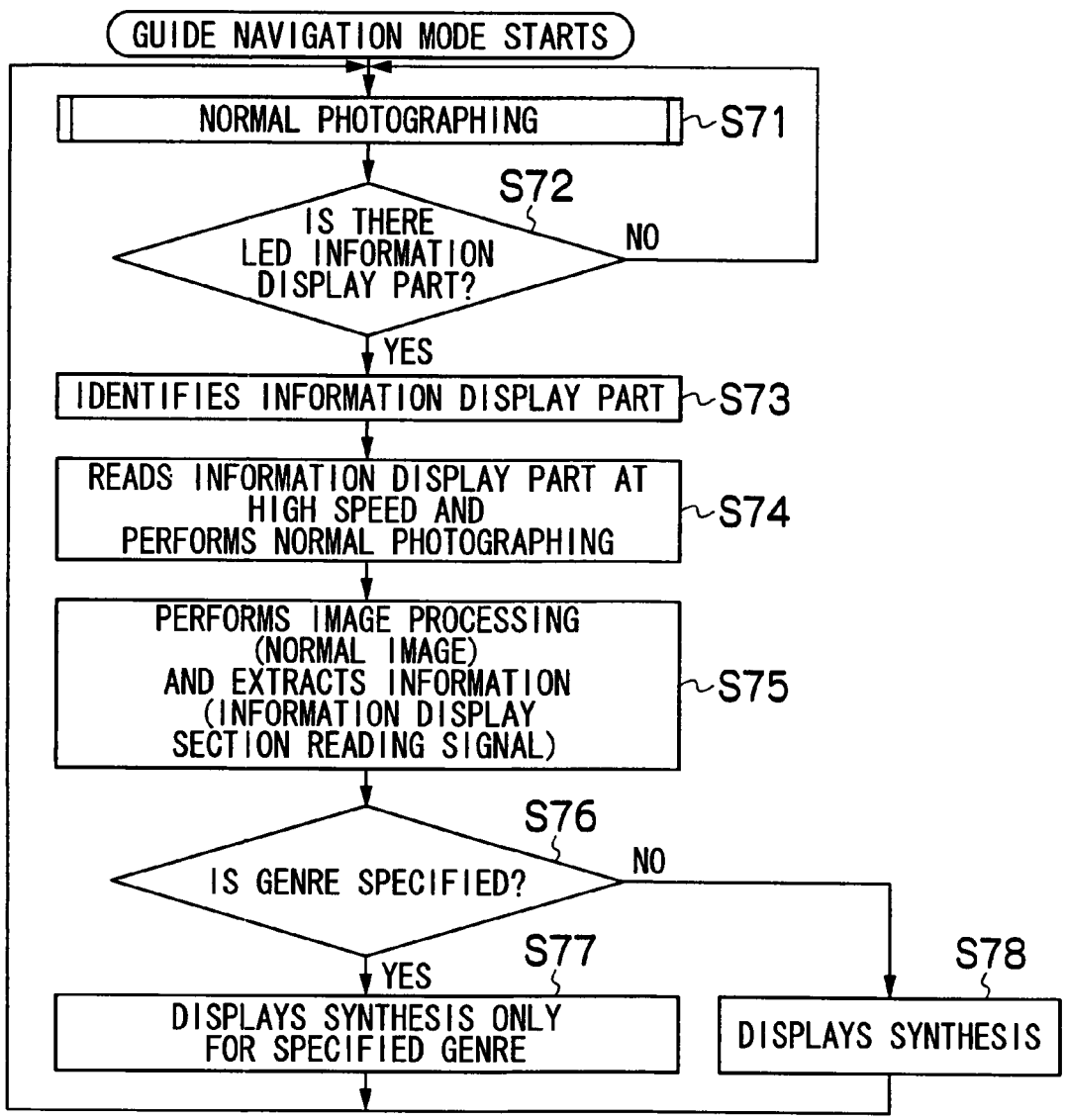
FIG. 25 is a flowchart showing the flow of guide navigation mode processing according to an eighth embodiment.

FIG. 25 is a flowchart showing the flow of the guide navigation mode processing according to the eighth embodiment.

Steps S71 to S74 are similar to steps S1 to S4 in the first embodiment.

At step S75, various processings of image data by the signal processing circuit are performed. At the same time, the CPU 10 extracts information overlapped with the information transmission position part and genre information.

At step S76, the CPU 10 determines whether the genre indicated by "display all (not specify)" or any other particular genre has been selected on the genre selection screen. If a particular genre is selected, the flow proceeds to step S77. If the genre indicated by "display all (not specify)" is selected, the flow proceeds to step S78.

At step S77, the CPU 10 generates visually recognizable picture information based on the extracted information to which the genre information corresponding to the genre selected on the genre selection screen is added, synthesizes an acquired image and the extracted information and displays the synthesis on the display section 13.

At step S78, all the extracted information is displayed on the display section 13 similarly to step S6 in the first embodiment.

Figure 26:
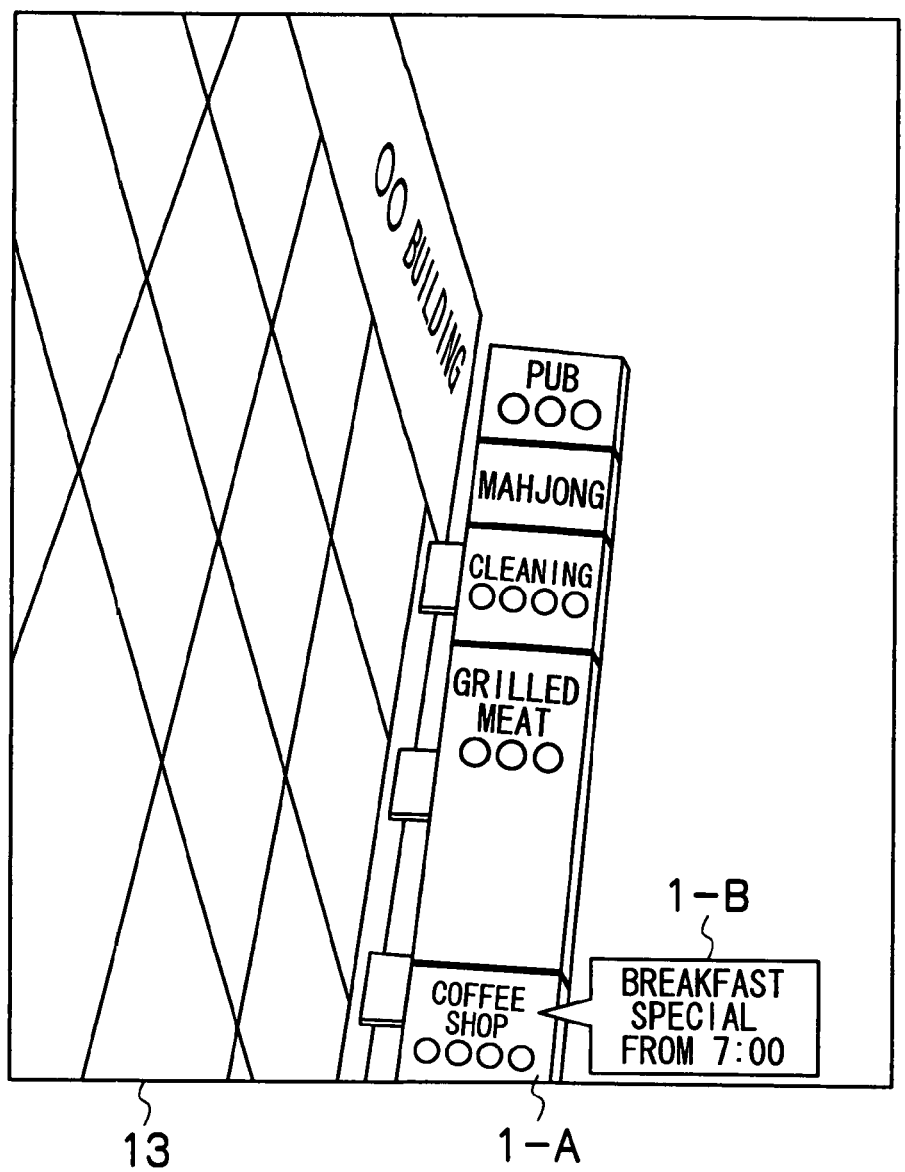
FIG. 26 is a diagram showing extracted information which is displayed when "coffee shop" is selected on the genre selection screen.

FIG. 26 shows the extracted information displayed on the display section 13 when "coffee shop" is selected on the genre selection screen, as an example. On the display section 13, an actual picture and information 1-B transmitted from an information transmission apparatus 1-A, which is the signboard of a coffee shop, are synthesized and displayed. The information 1-B is displayed, being surrounded by a words frame from the picture of the information transmission apparatus 1-A, so that the correspondence relation between both is known.

Only by adjusting the direction and the position of the portable information display apparatus 1 so that the camera section 20 of the information display apparatus 1 captures the display section 31 of the information transmission apparatus 2 incorporated with the signboard of "coffee shop" within the angle of field, the user can select and view only the information about "coffee shop" that he requires. Therefore, he can save the trouble of finding information he needs from the cumbersome screen information as shown in FIG. 23, and he can easily grasp the relationship between the actual image and the transmitted information.

Furthermore, because of the portability of the information display apparatus 1, it is possible to, if he brings the information display apparatus 1 to the position where a desired information transmission apparatus 2 can be seen, easily obtain detailed information of a genre he desires from his current position only by setting the angle of field of the camera section 20 for the desired information transmission apparatus 2.

<Ninth Embodiment>

If it is possible to acquire more detailed information by following the information of a desired genre as shown in FIG. 26, it is convenient.

Accordingly, the information transmission apparatus 2 transmits information to be criteria for specifying particular functions provided for the information display apparatus 1 to be driven (trigger information), and a user selects desired trigger information therefrom to drive a particular function specified by the trigger information so that the information display apparatus 1 can acquire detailed information from the information transmission apparatus 2 or other information transmission sources.

As examples of the functions provided for the information display apparatus 1, telephone (including portable TV phone) calling to a particular counterpart by the voice control section 18, communication with a particular counterpart (including a web server and a web camera) on a communication network by the radio transmission/receiving section 17, navigation to a destination within the range of adjacent areas, and conversion of information from the information transmission apparatus 2 to a voice signal and output of the information to the speech transmission/receiving section 19 (an information reading function) by the voice control section 18 are included.

In this case, as examples of the trigger information, the telephone number of a destination counterpart of telephone calling, the address of a counterpart on a communication network (including the address of a navigation data acquisition source), and information in such a format enabling the information to be used as both of picture information and voice information (for example, text data) are included.

The information display apparatus 1 displays the trigger information received from the information transmission apparatus 2 and causes particular trigger information to be selected.

Figure 27:
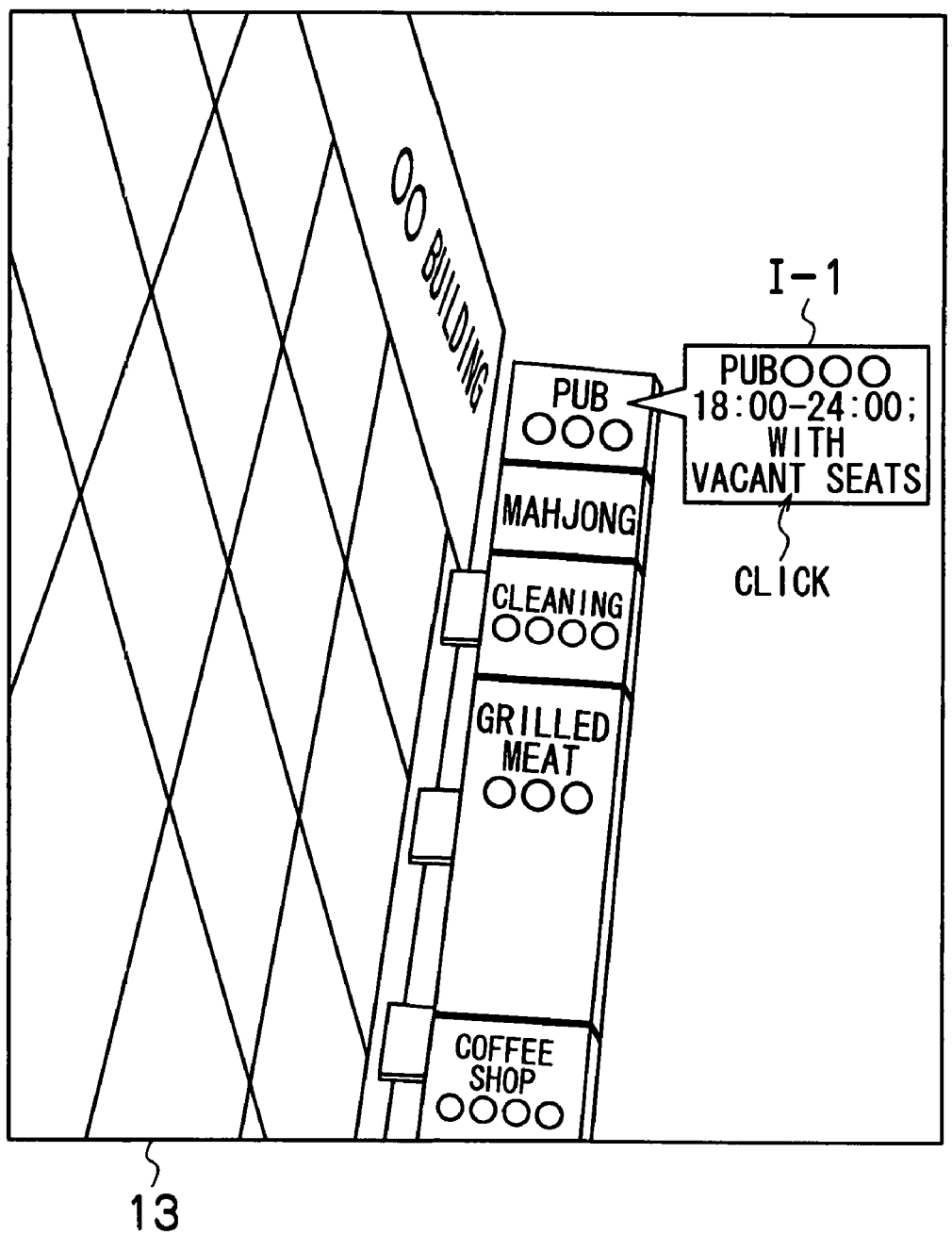
FIG. 27 is a diagram showing that only information I-1 to which "pub" genre information is added is displayed on the display section 13.

For example, it is assumed that, by the camera section 20 of the information display apparatus 1 capturing the display section 31 of an information transmission apparatus 2 incorporated with a signboard "pub" within the angle of field, the signboard "pub" and information I-1 to which "pub" genre information is added are displayed in the display section 13 as shown in FIG. 27.

Figure 28:
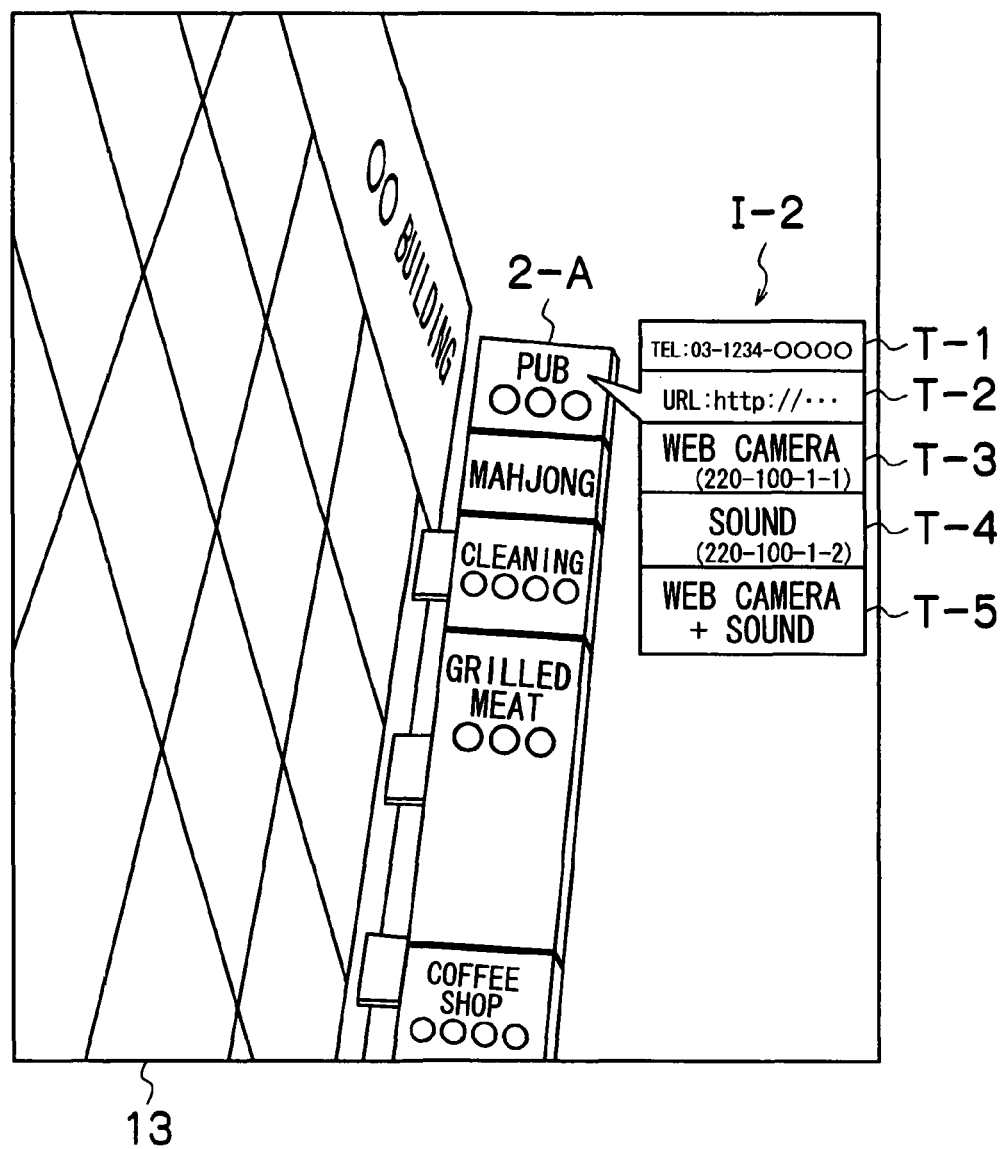
FIG. 28 is a diagram showing that trigger information is displayed in a list.

As shown in FIG. 28, when the information I-1 is clicked by an operation of the operation section 14, all trigger information I-2 (alternatively, an icon or other information indicating the trigger information is also possible) added to the information I-1 in advance is displayed as a list. It is desirable to display a picture showing the relationship between the information display apparatus 1 and the trigger information together.

In FIG. 28, the telephone number T-1 of an pub which is a sponsor of a certain information transmission apparatus 2-A, the address (URL) T-2 of the web page of the pub, and the transmission source address T-3 of a streaming picture from a web camera installed in the pub and the transmission source address T-4 of voice from a web microphone installed in the pub or the transmission source address T-5 of both of a streaming picture and voice are displayed in association with the actual picture of the information transmission apparatus 2-A of the pub as the trigger information.

The user can select desired trigger information from among trigger information displayed in the trigger information list I-2 by operating the operation section 14.

Figure 29A:
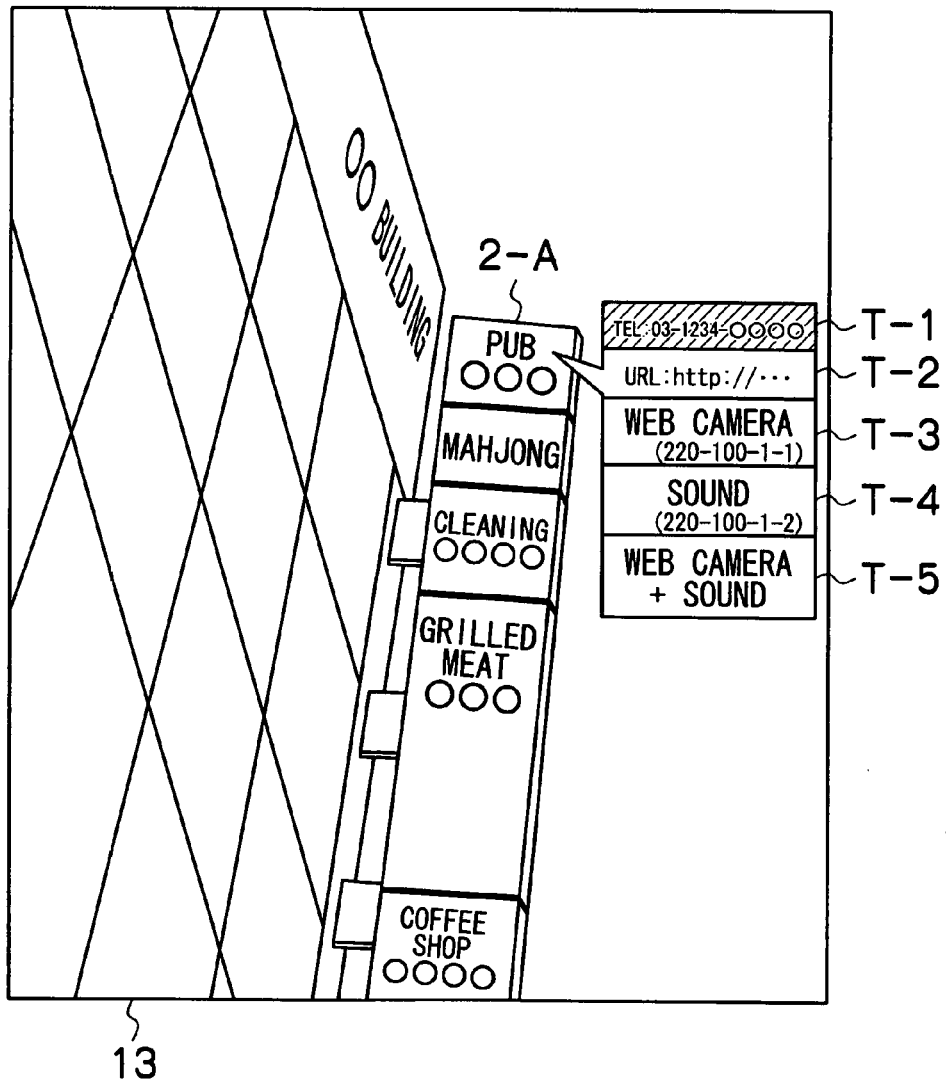
FIGS. 29A and 29B are diagrams showing an operation performed when a telephone number, one of the trigger information, is specified.
Figure 29B:
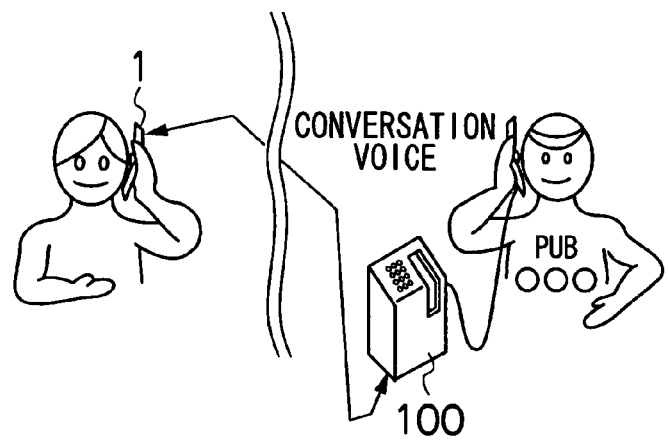

FIGS. 29 to 31 show an example of the operation of the information display apparatus 1 performed when any of the trigger information T-1 to T-5 is selected from the trigger information list I-2.

By the telephone number T-1 being specified, the information display apparatus 1 calls the telephone number T-1, as shown in FIG. 29A. When the calling is answered with a telephone 100 of the pub, which is the calling destination of the information display apparatus 1, conversation for confirmation or application of reservation can be made between the user of the information display apparatus 1 and the employee who has answered the calling to the telephone 100 of the pub. The user can obtain the telephone number only by pointing the information display apparatus 1 at the signboard "pub" and does not have to manually input the number for calling.

Figure 30A:
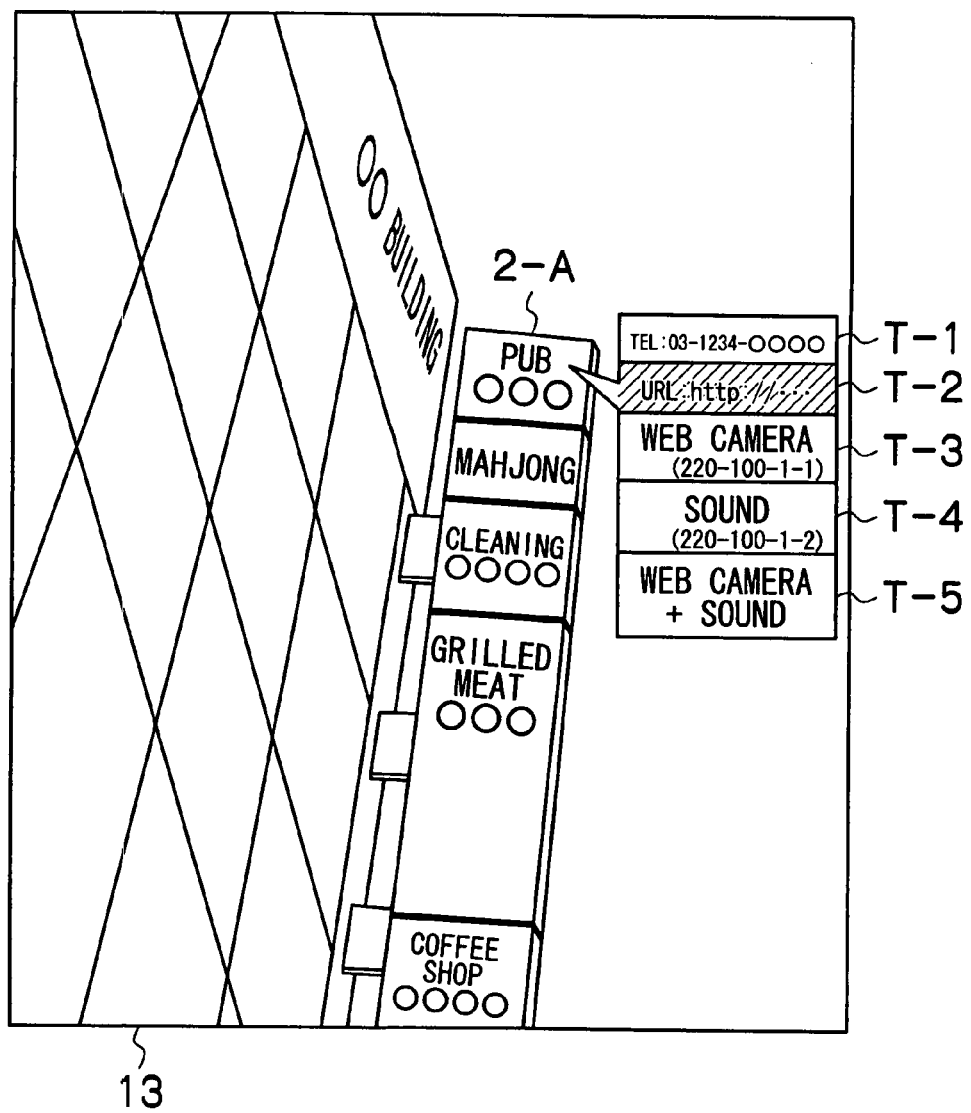
FIGS. 30A aid 30B are diagrams showing an operation performed when a web page address, one of the trigger information, is specified.
Figure 30B:

When the address T-2 is specified and the information display apparatus 1 accesses the address T-2, a web page showing a coupon ticket or the like is transmitted from the address to the information display apparatus 1, as shown in FIG. 30A. When receiving this web page, the information display apparatus 1 displays the web page on the display section 13 instead of synthesizing and displaying an image and extracted information, as shown in FIG. 30B. By carrying the information display apparatus 1 to the pub and showing it to the employee of the pub, the user can enjoy discount for drinking and eating or various benefits.

Figure 31A:
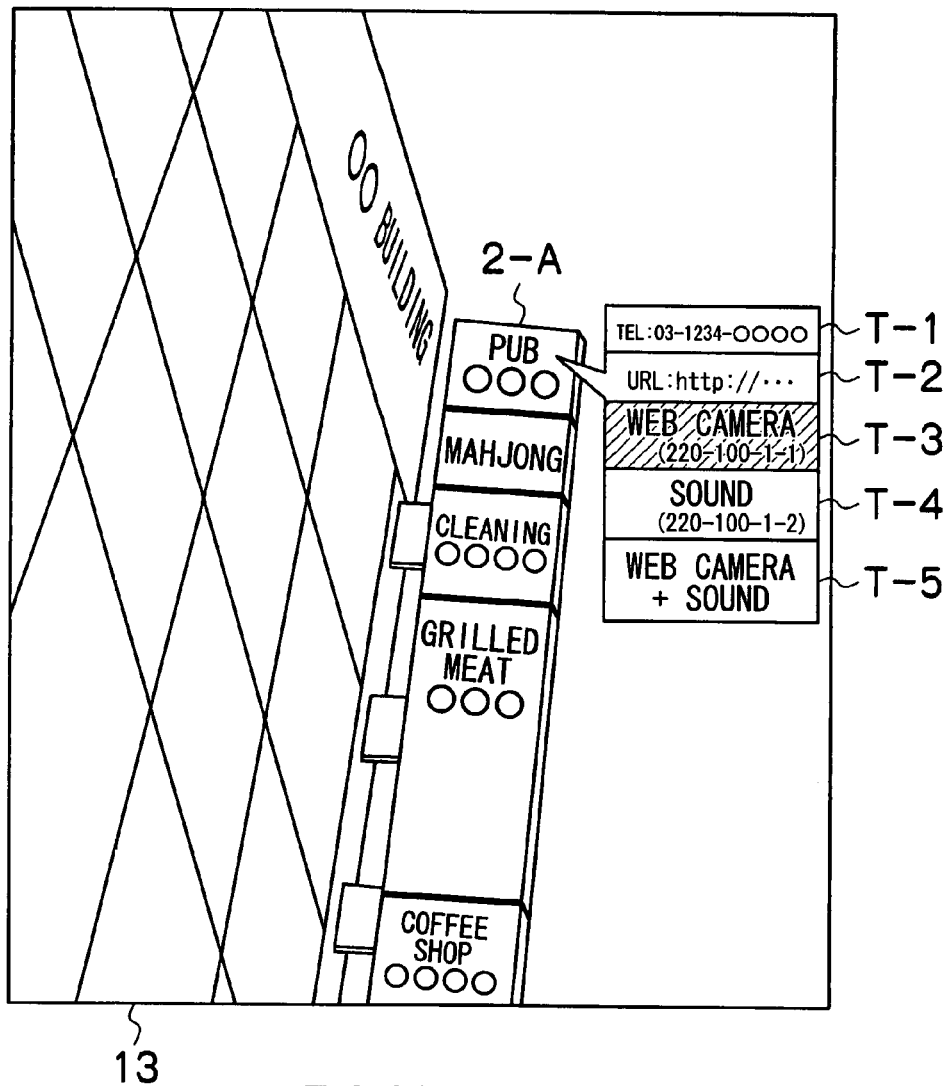
FIGS. 31A and 31B are diagrams showing an operation performed when a web camera address, one of the trigger information, is specified.
Figure 31B:
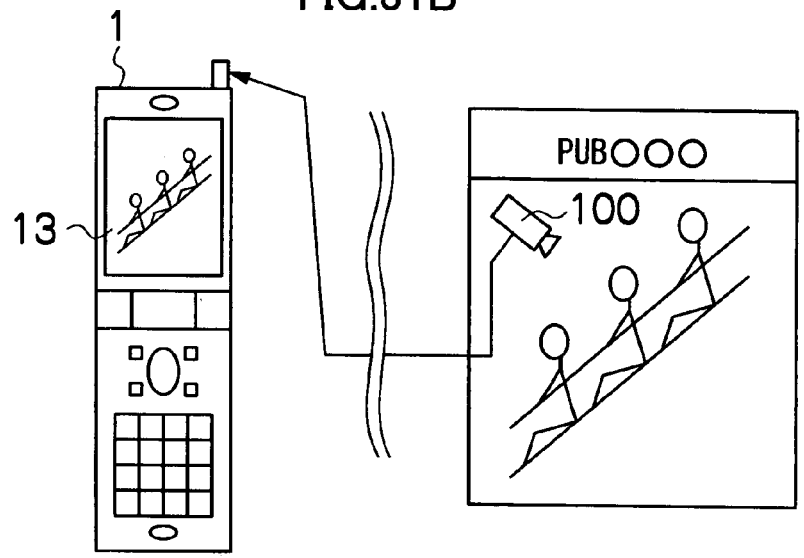

When the address T-3 is specified and the information display apparatus 1 accesses the address T-3, a picture taken by a web camera 100 capturing the inside of the pub within the angle of field is delivered from the address to the information display apparatus 1, as shown in FIG. 31A. When receiving the delivered picture from the web camera 100, the information display apparatus 1 displays the delivered picture on the display section 13 instead of synthesizing and displaying an image and extracted information, as shown in FIG. 31B. The user can recognize the current condition of the pub, such as a crowded condition, at a glance without moving from the current position.

Figure 32A:
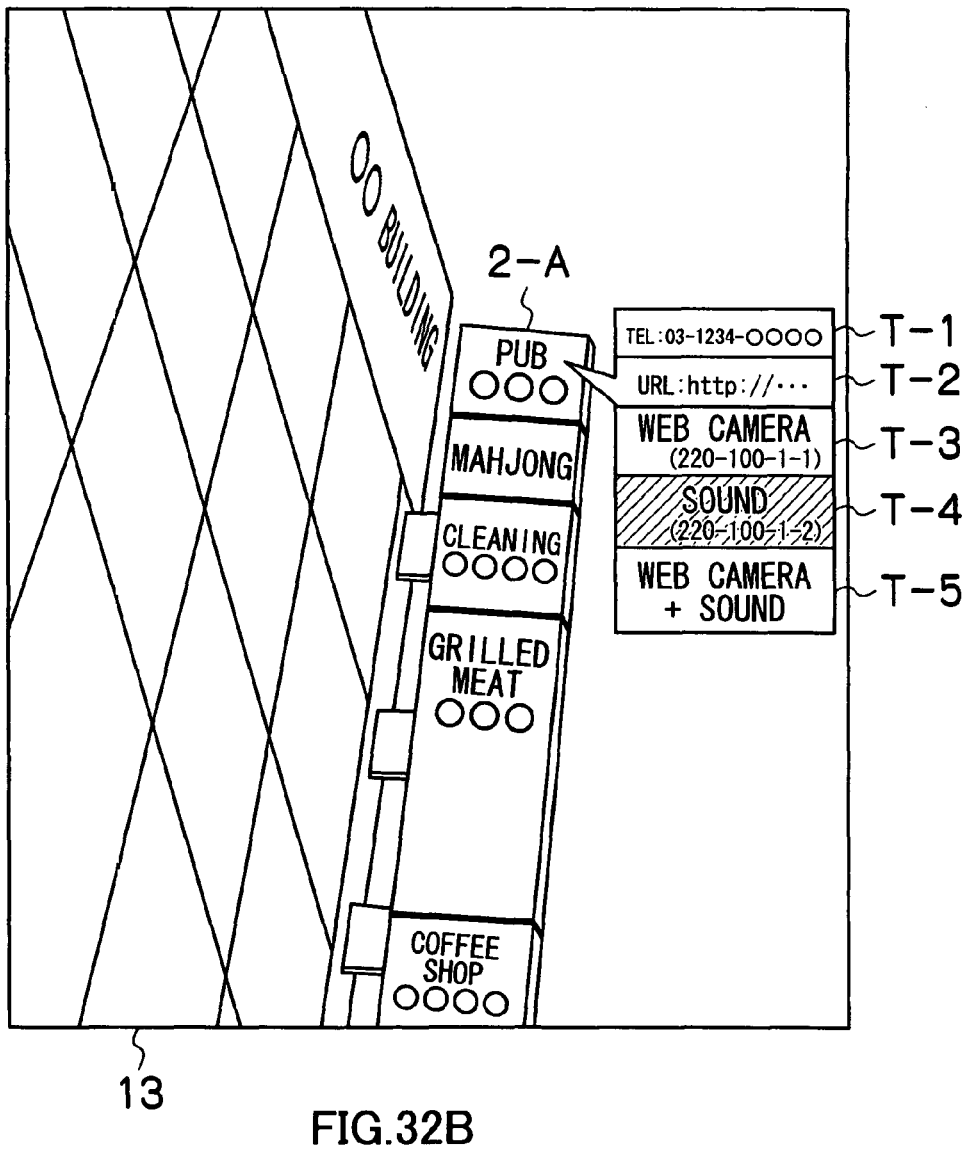
FIGS. 32A and 32B are diagrams showing an operation performed when a web microphone address, one of the trigger information, is specified.
Figure 32B:
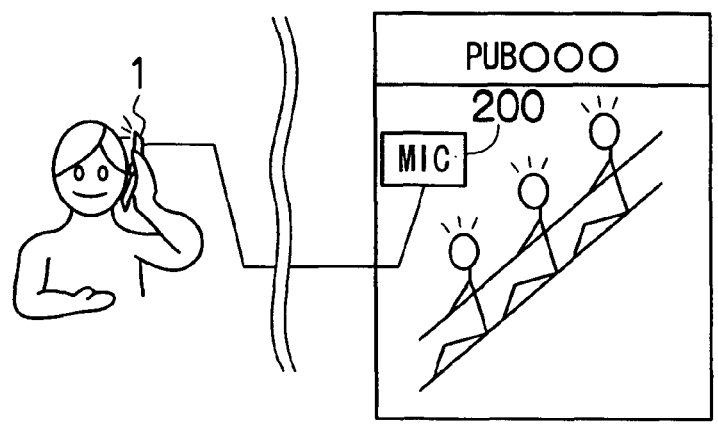

When the address T-4 is specified and the information display apparatus 1 accesses the address the T-4, the voice in the pub is delivered from a web microphone 200 for collecting sounds occurring in the pub to the information display apparatus 1, as shown in FIG. 32A. When receiving the delivered voice, the information display apparatus 1 reproduces the voice from the speech transmission/receiving section 19, as shown in FIG. 32B. The user can recognize the current condition of the pub, such as a crowded condition, from the voice reproduced from the information display apparatus 1 without moving from the current position.

By the address T-5 being specified, the picture from the web camera 100 and the voice from the web microphone 200 are delivered to the information display apparatus 1 at the same time, and both of the picture and the sound are reproduced, though it is not shown.

Thereby, it is avoided to confuse a user by presenting a lot of information to him at a time, and it is possible to provide detailed information he really needs via the portable information display apparatus 1.

<Tenth Embodiment>

A user can move to various places carrying the portable information display apparatus 1. When the user moves to a place where a lot of information transmission apparatuses 2 exist as shown in FIG. 23 described above, each of the lot of information transmission apparatuses 2 independently and separately transmits information to the information display apparatus 1 from the display section 31 without any restriction. Then, a lot of information is displayed on the display section 13 of the information display apparatus 1 at a time, or it is difficult to display all the information. Seeing such display, the user is confused, and a lot of time is required to obtain information he needs.

In this embodiment, in consideration of this problem, the information received from a lot of information transmission apparatuses 2 is displayed, being arranged as appropriately as possible.

Figure 33:
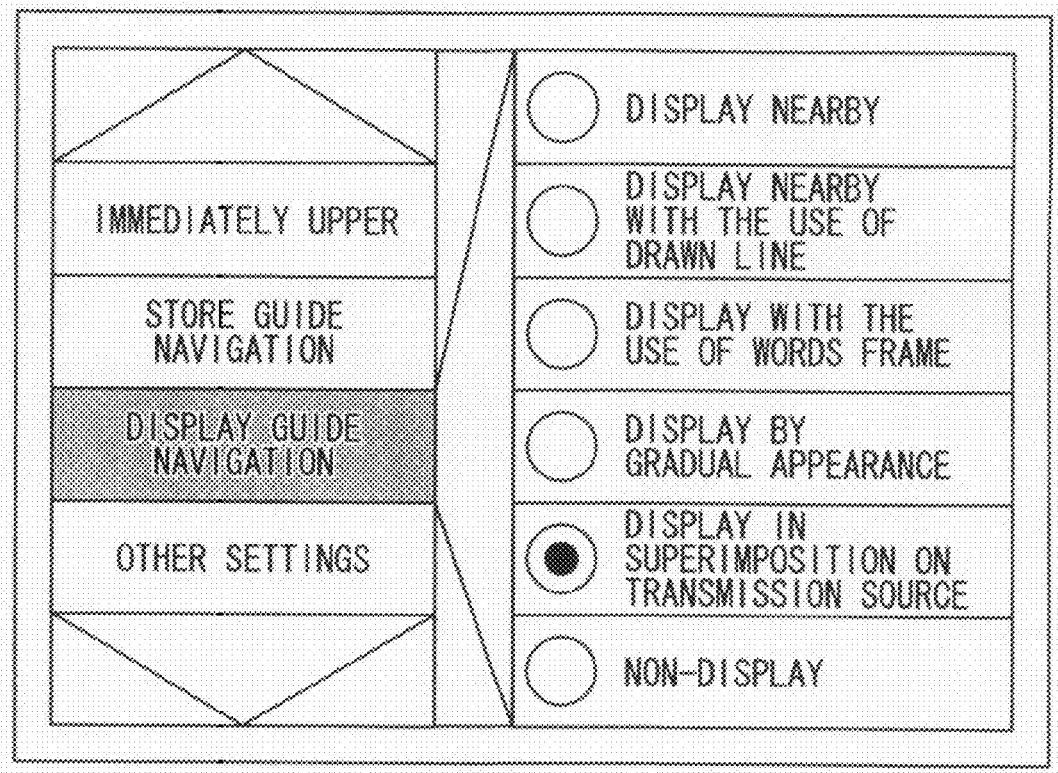
FIG. 33 is a diagram showing that a "display in superimposition on transmission source" item is selected on an operation setting screen.

That is, the information display apparatus 1 recognizes the display area of the display section 31, which is the transmission source of information difficult to visually recognize, from the picture of the information transmission apparatus 2 captured in the angle of filed by the camera section 20, for example, based on the periphery, and arranges visually recognizable information so that the information is adapted to the recognized display area of the display section 31, for example, at such a position that the information is included inside the recognized periphery. Whether or not to make such arrangement can be arbitrarily set, for example, by selecting the "display in superimposition on transmission source" item on the operation setting screen as shown in FIG. 33.

Here, it is preferable to array light emission devices,-such as LED emitters, for optically indicating at least the periphery part of the display section 31 so that the information display apparatus 1 can easily recognize the periphery of a rectangle, which is one of planar forms of the display section 31.

Figure 34A:
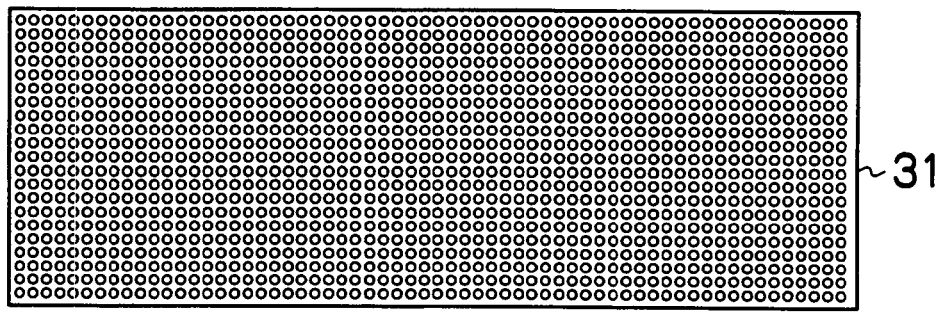
FIGS. 34A to 34C are diagrams showing that light emission devices are arranged at least at the outermost part of the display section.
Figure 34B:
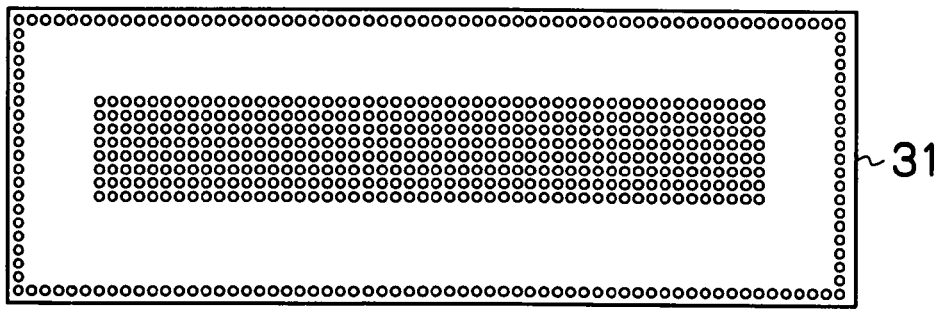
Figure 34C:
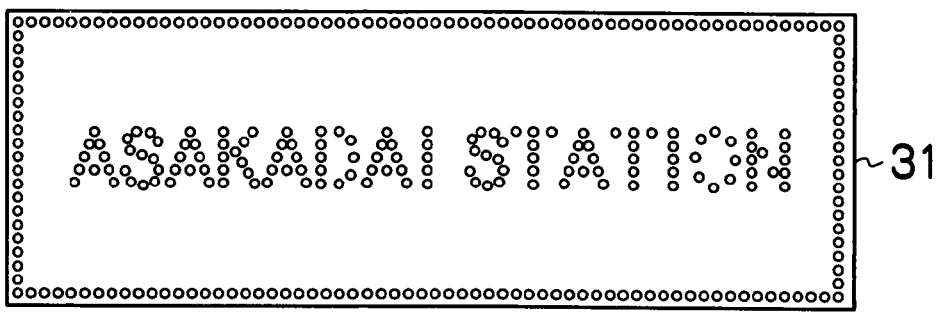

For example, the display devices which are also used as light emission devices may be arranged over the whole surface of the display section 31 as shown in FIG. 34A. Alternatively, it is also possible to arrange light emission devices at the outmost periphery part of the display section 31 and arrange display devices over the whole surface of a predetermined area inside the outmost periphery part, as shown in FIG. 34B. Alternatively, it is also possible to arrange light emission devices on the outmost periphery part of the display section 31 and array display devices in the form of predetermined characters inside the outmost periphery part, as shown in FIG. 34C. As described above, if light emission devices are arranged at least on the outmost periphery part of the display section 31, display devices inside the outmost periphery part can be arbitrarily arrayed.

Figure 35A:
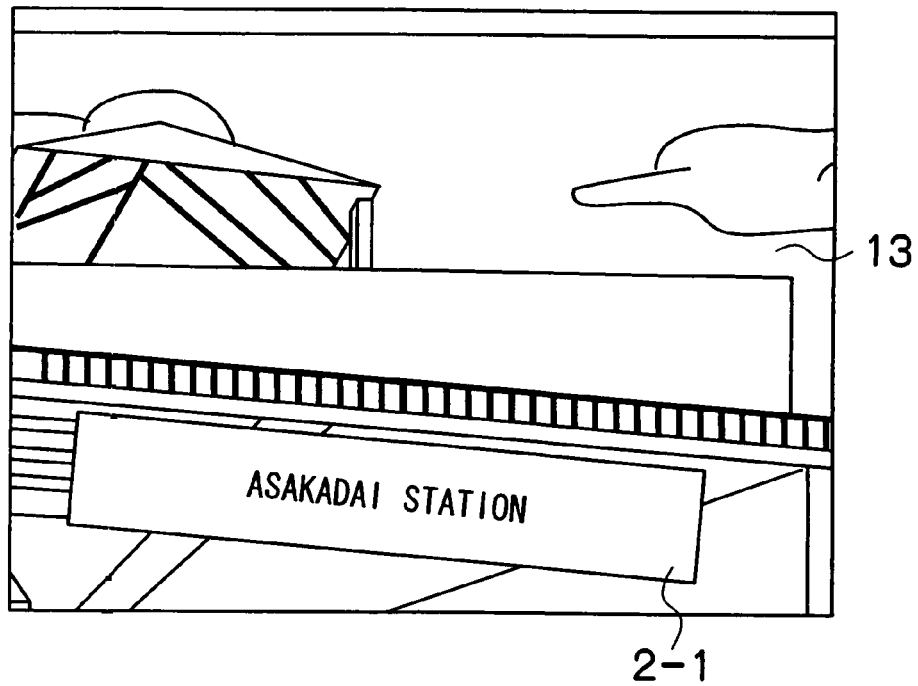
FIGS. 35A and 35B are diagrams showing an example of a planar form on the display section of the information display apparatus.
Figure 35B:
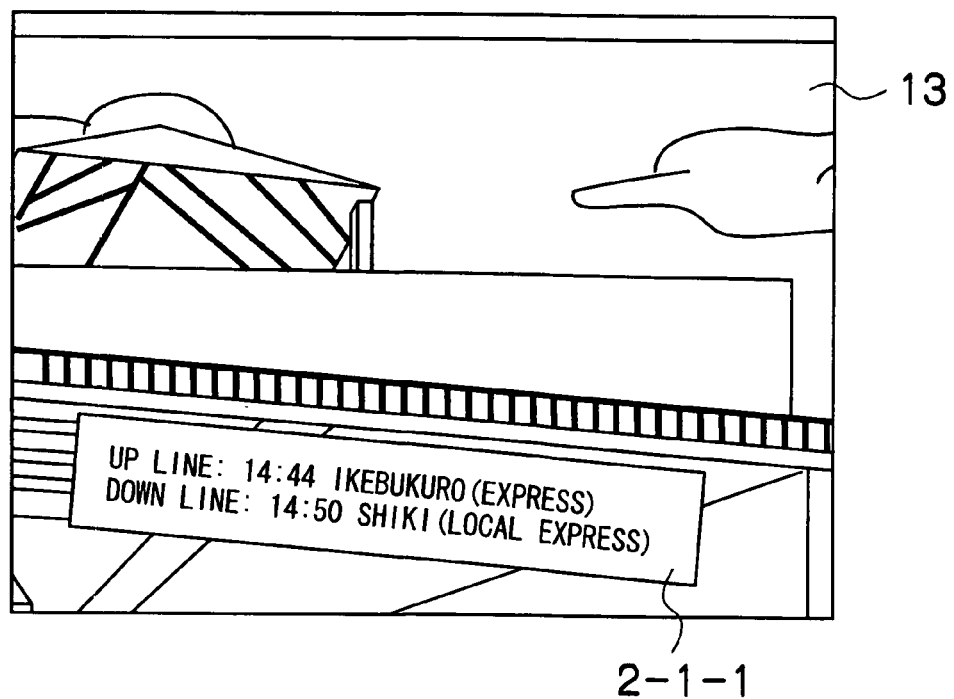

FIG. 35A shows the periphery of a rectangle, which is an example of the planar form of the display section 31 of the information display apparatus 2-1, and FIG. 35B shows an example of the information 2-1-1 arranged within the rectangular periphery in a manner that it is fit to the planar form of the display section 31.

Unlike FIG. 7 and FIG. 8, it is possible to prevent the display on the display section 13 from being cumbersome due to a lot of extracted information obtained when a user freely moves with the portable information display apparatus 1, though there is a possibility that visually recognizable information from the display section 31 may be covered with the extracted information.

Depending on the view from the user's current position and the angle of field of the camera section 20, there may be a case where the planar forms of different display sections 31 overlap with each other, and such an area R that a part of the periphery of the display section 31 is hidden exists, so that the part of the periphery of the display section 31 cannot be recognized, as shown in FIG. 36A. In this case, the hidden peripheral part in the overlap area R is estimated from the form of the recognized part of the periphery of the display section 31, and the unrecognizable periphery part is complemented by the estimated periphery L, as shown in FIG. 36B. After that, the extracted information 2-1-1 can be arranged in a manner that it is included in the completed periphery.

Even if a part of the display section 31 is hidden behind a common obstruction H, such as a power pole and a tree, as shown in FIG. 36C, the hidden part of the periphery is estimated and complemented similarly to the above case, and the extracted information 2-1-1 can be arranged in a manner that it is included in the completed periphery as shown in FIG. 35D. Thereby, even if different display sections 31 overlap with each other or even if a part of a display section 31 is hidden behind an obstruction, it is possible to arrange extracted information in a manner that it is included within the periphery of the display section 31 and prevent a lot of pieces of extracted information from visually interfering with one another and being difficult to view. Furthermore, it becomes unnecessary for the user to move to a position where he can obtain a view without any obstruction, carrying the information display apparatus 1, and re-set the angle of field of the camera section 20 for the desired view of the display section 31.

<Eleventh Embodiment>

As described above, the information display apparatus 1 converts information difficult to visually recognize, which has been optically received from the information transmission apparatus 2 to visually recognizable picture information and displays it on the display section 13. However, a case is conceivable where a user cannot see the picture information well because of the user's visual problem or the restriction of the display size of the display section 13.

As an auxiliary function on the assumption of such a user, the voice control section 18 of the information display apparatus 1 may convert the information difficult to visually recognize, which has been optically received from the information transmission apparatus 2 to voice and output the voice. It is preferable that the information difficult to visually recognize is data with a data structure which enables the information display apparatus 1 to convert the information to any of picture information and voice information, for example, text data.

However, if all information from a lot of information transmission apparatuses 2 is converted to voice, the user may be confused. Therefore, only information from a particular information transmission apparatus 2 is converted to voice.

Figure 37A:
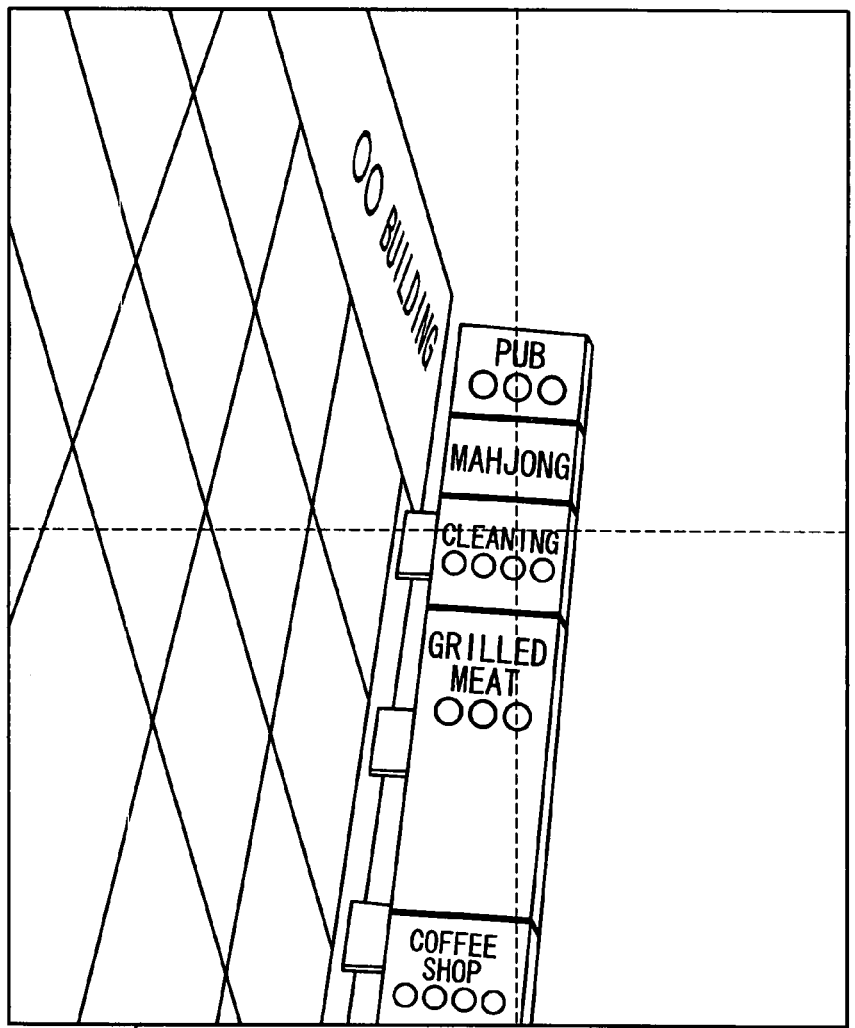
FIGS. 37A and 37B are diagrams showing that information transmitted from a particular position within the angle of field of a camera section is reproduced by voice.

For example, the voice control section 18 converts only information of such an information transmission apparatus 2 that its information transmission position is a particular position, for example, the central part in the angle of field of the camera section 20, to voice, as shown in FIG. 37A.

Figure 37B:
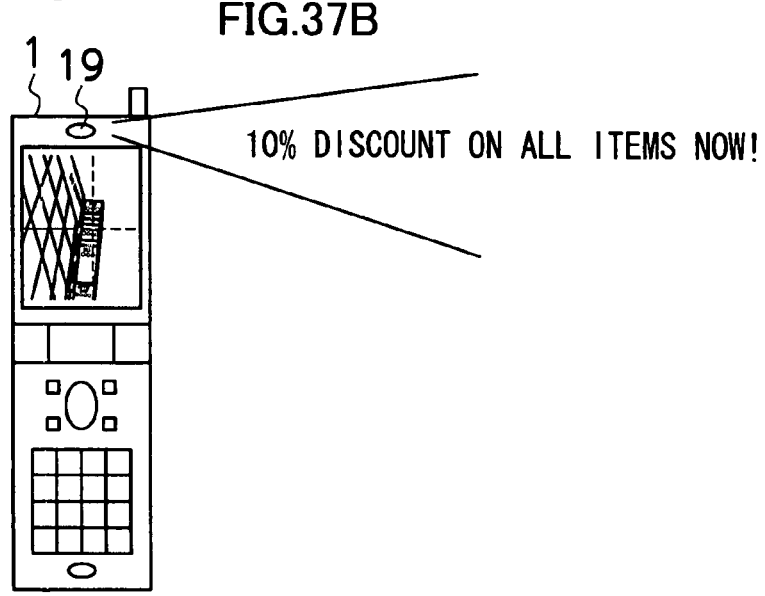

Then, particular extracted information is reproduced in a form of voice from the speech transmission/receiving section 19 as shown in FIG. 37B, and thereby, it is possible to aurally recognize the information even if picture information cannot be seen.

That is, by carrying the information display apparatus 1 to a position where a desired information transmission apparatus 2 can be seen and adjusting the position and the direction of the information display apparatus 1 so that the desired information transmission apparatus is captured in the center of the angle of field of the camera section 20, the user can aurally recognize extracted information transmitted from the information transmission apparatus 2 captured in the center of the angle of field.

The voice reading function can be included as one of pieces of trigger information. Therefore, it is possible to, only when the voice reading function has been activated in advance by specification of the trigger information, and information is being transmitted from a particular position in the angle of field, convert only information from the particular position to voice. Thereby, it is possible to use the voice reading function as necessary.

What is claimed is:

1. An information provision apparatus, comprising:
   an acquisition section which captures, by an imaging element, an image in which a subject thereof is an equipment, wherein said equipment is configured to optically provide visually recognizable information and information difficult to visually recognize, to continuously acquire by said acquisition section an image including said optically provided visually recognizable information and said optically provided information difficult to visually recognize,
   said information difficult to visually recognize being provided by controlling a frequency of a blink of one or more light emitters included in said equipment;
   a display control section which converts said optically provided information difficult to visually recognize acquired by the acquisition section to visually recognizable picture information and displays said visually recognizable picture information and the image including said visually recognizable information on a display device, said picture information being superimposed on the image including said visually recognizable information: and
   a display setting section which sets a characteristic of a picture visually indicating association between said visually recognizable information and said visually recognizable picture information,
   wherein the display control section controls the display device to display the picture visually indicating the association on the image according to the characteristic set by the display setting section,
   wherein the picture visually indicating the association includes at least any one of a picture in which the picture information is arranged near the visually recognizable information in the image, a picture in which a line positioned between the visually recognizable information in the image and the picture information is shown, a picture in which a words frame from the visually recognizable information in the image and the picture information arranged in the words frame are shown. a picture in which gradual appearance of the picture information from the visually recognizable information in the image is shown, and a picture in which the visually recognizable information in the image and the picture information are alternately displayed.
   said information provision apparatus further comprising:
   a recording section which records at least one of the image and the picture information in a condition that the picture information is visually associated with the visually recognizable information or in a condition that the picture information is not visually associated with the visually recognizable information,
   a recording setting section which sets whether or not to record the image in the condition that the picture information is visually associated with the visually recognizable information, whether or not to separately record the information difficult to visually recognize or whether or not to separately record the image.
   wherein the recording section records. according to the setting by the record setting section, the image in the condition that the picture information is visually associated with the visually recognizable information, separately records each of the image and the information difficult to visually recognize in the condition that the picture information is not visually associated with the visually recognizable information. separately records the information difficult to visually recognize or separately records the image,
   further comprising a movement setting section which sets a destination position to which the picture information is to he moved on the display section,
   wherein the display section moves the picture information to the movement destination position set by the movement setting section and displays the information at the position.
   said information provision apparatus further comprising a display enable/disable setting section which sets whether or not to display the picture information,
   wherein the display section displays or does not display the picture information according to the setting made by the display enable/disable setting section.

2. An information provision system, comprising:
   an information provision section which optically provides visually recognizable information, and also provides information difficult to visually recognize by controlling a frequency of a blink of one or more light emitters included in said information provision section;
   an acquisition section that captures, by an imaging element, an image in which a subject thereof is the information provision section, thus acquiring an image including said optically provided visually recognizable information, and said optically provided information difficult to visually recognize;
   a display control section which converts the optically provided information difficult to visually recognize acquired by the acquisition section to visually recognizable picture information and displays said visually recognizable picture information and said image including said visually recognizable information on a display device, said visually recognizable picture information being superimposed on said image including said visually recognizable information; and a display setting section which sets a characteristic of a picture visually indicating association between said visually recognizable information and said visually recognizable picture information, wherein the display control section controls the display device to display the picture visually indicating said association on the image according to the characteristic set by the display setting section.

3. An information provision method, comprising the steps of:

capturing, by an imaging element, an image in which a subject thereof is an equipment, wherein said equipment is configured to optically provide visually recognizable information and information difficult to visually recognize, to continuously acquire by said capturing an image including said optically provided visually recognizable information, and said optically provided information difficult to visually recognize, wherein said information difficult to visually recognize is provided by controlling a frequency of a blink of one or more light emitters included in said equipment;

converting said acquired information difficult to visually recognize to visually recognizable picture information, and displaying said visually recognizable picture information and said image including said visually recognizable information on a display device, said picture information being superimposed on said image including said visually recognizable information; and setting a characteristic of a picture visually indicating association between said visually recognizable information and said visually recognizable picture information; and displaying said picture visually indicating the association on the image according to the set characteristic.

4. An information provision apparatus, comprising:

an acquisition section which captures, by an imaging element, an image in which a subject thereof is an equipment, wherein said equipment is configured to optically provide visually recognizable information, information difficult to visually recognize, and classification information classifying the information difficult to visually recognize, to continuously acquire by said acquisition section, an image including said optically provided visually recognizable information, said optically provided information difficult to visually recognize and the classification information, said information difficult to visually recognize being provided by controlling a frequency of a blink of one or more light emitters included in said equipment;

a display classification setting section which sets, using said classification information, information to be displayed from among said optically provided information difficult to visually recognize which has been acquired by the acquisition section; and a display control section which converts said optically provided information difficult to visually recognize selected by the display classification setting section using said classification information to visually recognizable picture information, and displays said visually recognizable picture information and said image on the display device, said picture information being superimposed on said image.

5. An information provision apparatus, comprising:

an acquisition section which captures, by an imaging element. an image in which a subject thereof is an equipment, wherein said equipment is configured to optically provide visually recognizable information, information difficult to visually recognize, and trigger information which is information specifying a source of providing information related to the visually recognizable information. to continuously acquire by said acquisition section an image including said optically provided visually recognizable information, said optically provided information difficult to visually recognize and the trigger information, said information difficult to visually recognize being provided by controlling a frequency of a blink of one or more light emitters included in said equipment;

a display control section which converts said optically provided information difficult to visually recognize acquired by the acquisition section to visually recognizable picture information, and displays at least one of said visually recognizable picture information and the trigger information on the image including said visually recognizable information in association with the image on the display device:

an information selection section which selects desired trigger information among the trigger information displayed on the display device; and a related information provision section which acquires and provides related information from a provision source specified by the trigger information selected by the information selection section, wherein the trigger information includes the address of a content data delivery source; and the related information provision section comprises a communication section which connects to the address of the content data delivery source included in the trigger information selected by the information selection section to acquire the related information, and wherein the trigger information includes the telephone number of the source of providing the visually recognizable information; and the related information provision section comprises a telephone conversation section which connects to the telephone number included in the trigger information selected by the information selection section to transmit and receive at least conversation voice.

6. An information provision apparatus, comprising:

an acquisition section which captures by an imaging element, an image in which a subject thereof is an equipment, wherein said equipment is configured to optically provide visually recognizable information and information difficult to visually recognize, to continuously acquire by said acquisition section an image including said optically provided visually recognizable information and said optically provided information difficult to visually recognize, said information difficult to visually recognize being provided by controlling a frequency of a blink of one or more light emitters included in said equipment;

an area recognition section which recognizes an area for which the equipment provides visually recognizable information; and a display control section which converts said optically provided information difficult to visually recognize acquired by the acquisition section to visually recognizable picture information, and displays said visually recognizable picture information on a display device in a condition that said visually recognizable picture information is superimposed on the area in the image including the visually recognizable information, which has been recognized by the area recognition section, in a manner that the picture information fits to the area.

* * * * *